(12) United States Patent
Kanzaki et al.

(10) Patent No.: US 7,829,174 B2
(45) Date of Patent: Nov. 9, 2010

(54) WEATHERSEALS

(75) Inventors: Toyohiro Kanzaki, Okazaki (JP); Masaru Nakayama, Anjo (JP); Takashi Kawashita, Nishio (JP); Grant E. Wylie, Honeoye, NY (US); Alan Demello, New Market, NH (US); James V. Albanese, Lyons, NY (US)

(73) Assignees: Tsuchiya Tsco Co., Ltd, Aichi (JP); Ultrafab, Inc., Farmington, NY (US)

( * ) Notice: Subject to any disclaimer, the term of this patent is extended or adjusted under 35 U.S.C. 154(b) by 238 days.

(21) Appl. No.: 11/587,607

(22) PCT Filed: Apr. 27, 2004

(86) PCT No.: PCT/US2004/012878
§ 371 (c)(1),
(2), (4) Date: Oct. 27, 2006

(87) PCT Pub. No.: WO2005/113239
PCT Pub. Date: Dec. 1, 2005

(65) Prior Publication Data
US 2008/0063831 A1    Mar. 13, 2008

(51) Int. Cl.
*B32B 3/02* (2006.01)
*E06B 7/16* (2006.01)
(52) U.S. Cl. .............................. 428/93; 428/92; 428/88; 49/475.1; 49/495.1; 49/479.1
(58) Field of Classification Search ............... 428/92, 428/93, 97, 95, 88; 399/353; 49/475.1, 495.1, 49/479.1
See application file for complete search history.

(56) References Cited

U.S. PATENT DOCUMENTS

| 2,994,929 | A | | 8/1961 | Kessler |
| 3,923,576 | A | | 12/1975 | Lind |
| 4,028,456 | A | * | 6/1977 | Lind ........................... 264/510 |
| 4,078,106 | A | * | 3/1978 | Lind ........................... 428/36.1 |
| 4,148,953 | A | | 4/1979 | Horton |
| 4,302,494 | A | | 11/1981 | Horton |
| 4,305,984 | A | | 12/1981 | Boyce |
| 4,307,139 | A | | 12/1981 | Yackiw |

(Continued)

FOREIGN PATENT DOCUMENTS

WO    WO 2005113239 A1 * 12/2005

*Primary Examiner*—Cheryl Juska
(74) *Attorney, Agent, or Firm*—Kenneth J. Lukacher; Martin Lukacher

(57) ABSTRACT

Weatherseals are provided by a pair of base members which may be attached to a pile formed by winding fibers around a band as the band travels along an endless path. A section of the pile on one side of the endless band is cut to provide cut pile section and a continuous pile section. The continuous pile section forms the bow, arch or loop by disposing the base members in side-by-side, back-to-back, or perpendicular relationship. The cut pile section may be removed at the base members or halves of the cut pile section maybe left in place. The cut pile section halves and the outside surface of the bow, arch, or ioop may be attached by base members to a member, such as by adhesive or via one or more T-shaped slots, that is in sealing relationship with another member and engagable therewith to provide a resilient seal.

47 Claims, 23 Drawing Sheets

U.S. PATENT DOCUMENTS

| | | | |
|---|---|---|---|
| 4,358,497 A * | 11/1982 | Miska | 428/85 |
| 4,555,171 A * | 11/1985 | Clouthier et al. | 399/175 |
| 4,713,130 A | 12/1987 | Evans et al. | |
| 4,781,388 A * | 11/1988 | Wohrl et al. | 277/355 |
| 4,849,270 A * | 7/1989 | Evans et al. | 428/85 |
| 5,060,422 A | 10/1991 | Horton | |
| 5,338,382 A | 8/1994 | Johnson et al. | |
| 5,807,451 A | 9/1998 | Johnson | |
| 5,817,390 A | 10/1998 | Johnson | |
| 6,024,815 A | 2/2000 | Norton | |
| 6,115,566 A * | 9/2000 | Ohara et al. | 399/103 |
| 6,711,858 B1 | 3/2004 | Albanese et al. | |
| 6,739,161 B2 * | 5/2004 | Ohara et al. | 66/194 |
| 6,878,428 B2 * | 4/2005 | Hope | 428/94 |
| 6,974,512 B2 * | 12/2005 | Henry et al. | 156/72 |
| 7,172,006 B2 * | 2/2007 | Day et al. | 156/445 |
| 7,212,779 B2 * | 5/2007 | Yanagizawa et al. | 399/353 |
| 7,329,450 B2 * | 2/2008 | Wylie et al. | 428/95 |
| 7,335,412 B2 * | 2/2008 | Wylie | 428/88 |
| 7,419,555 B2 * | 9/2008 | Kaplo et al. | 156/72 |
| 2004/0086309 A1 * | 5/2004 | Ohara et al. | 399/353 |
| 2005/0079319 A1 * | 4/2005 | Ohara et al. | 428/96 |
| 2006/0049559 A1 | 3/2006 | Ohara et al. | |
| 2007/0014966 A1 * | 1/2007 | Day et al. | 428/92 |
| 2007/0094934 A1 * | 5/2007 | Albanese et al. | 49/475.1 |
| 2007/0264466 A1 * | 11/2007 | DeMello | 428/89 |
| 2008/0093007 A1 * | 4/2008 | Wylie et al. | 156/72 |
| 2008/0105364 A1 * | 5/2008 | Hawkins et al. | 156/172 |
| 2008/0206512 A1 * | 8/2008 | Kanzaki et al. | 428/92 |

* cited by examiner

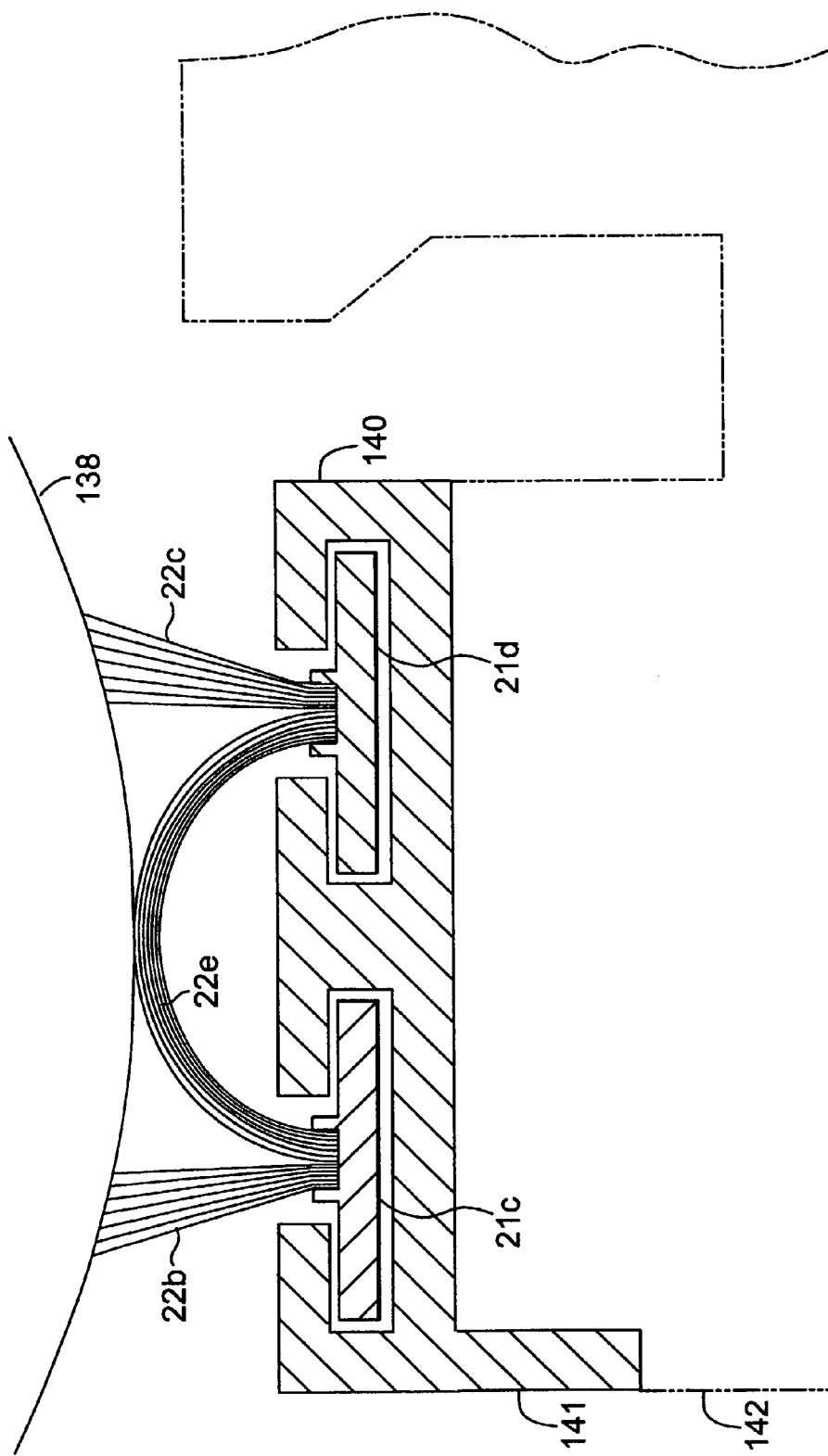

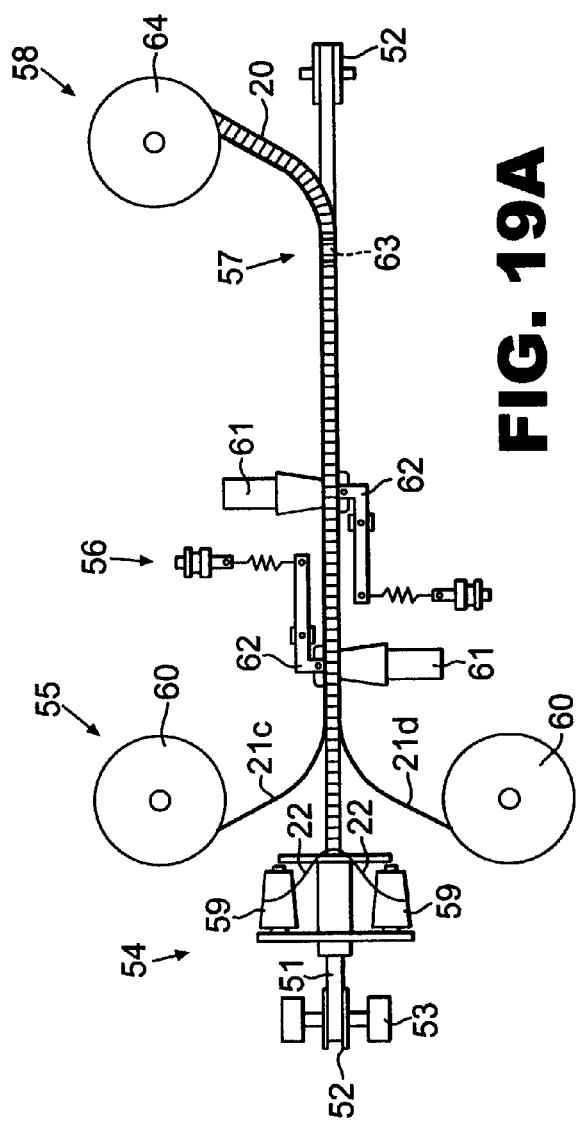
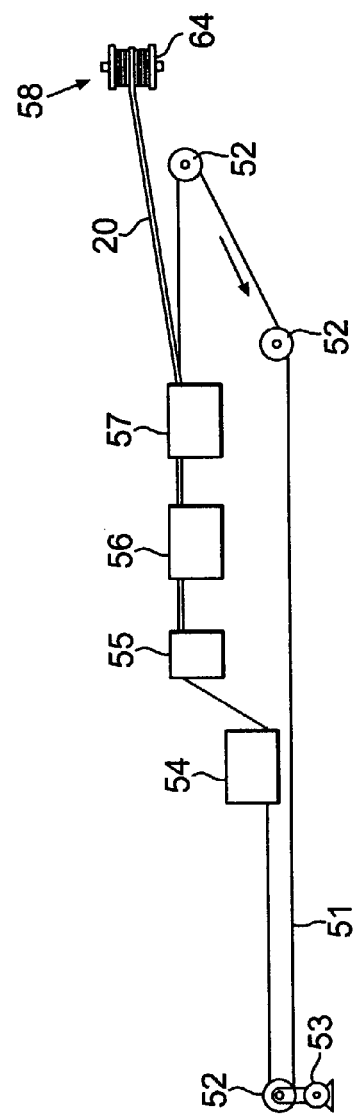
FIG. 19A
FIG. 19B

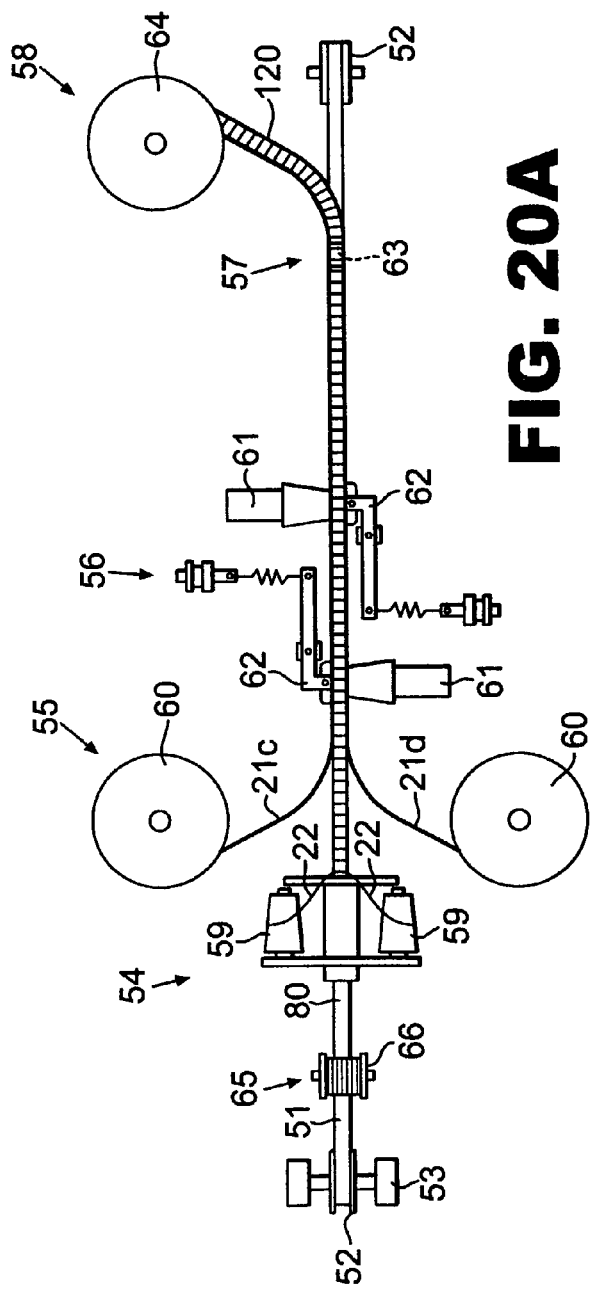
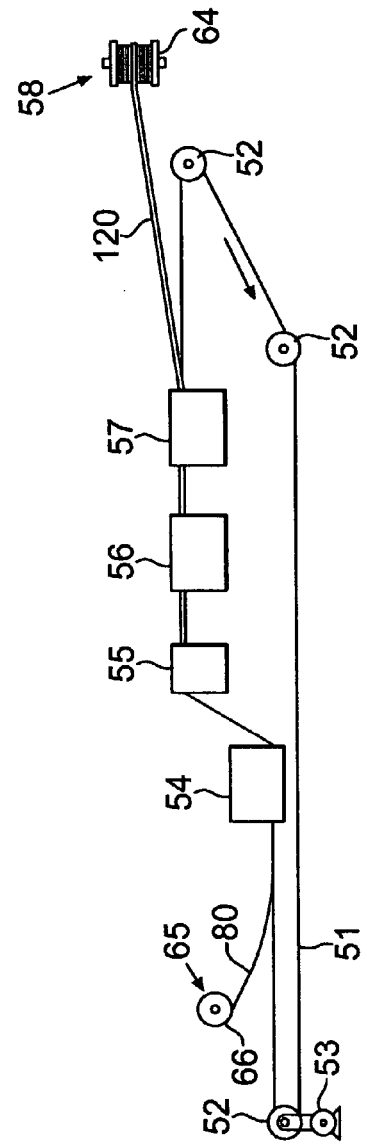
FIG. 20A
FIG. 20B

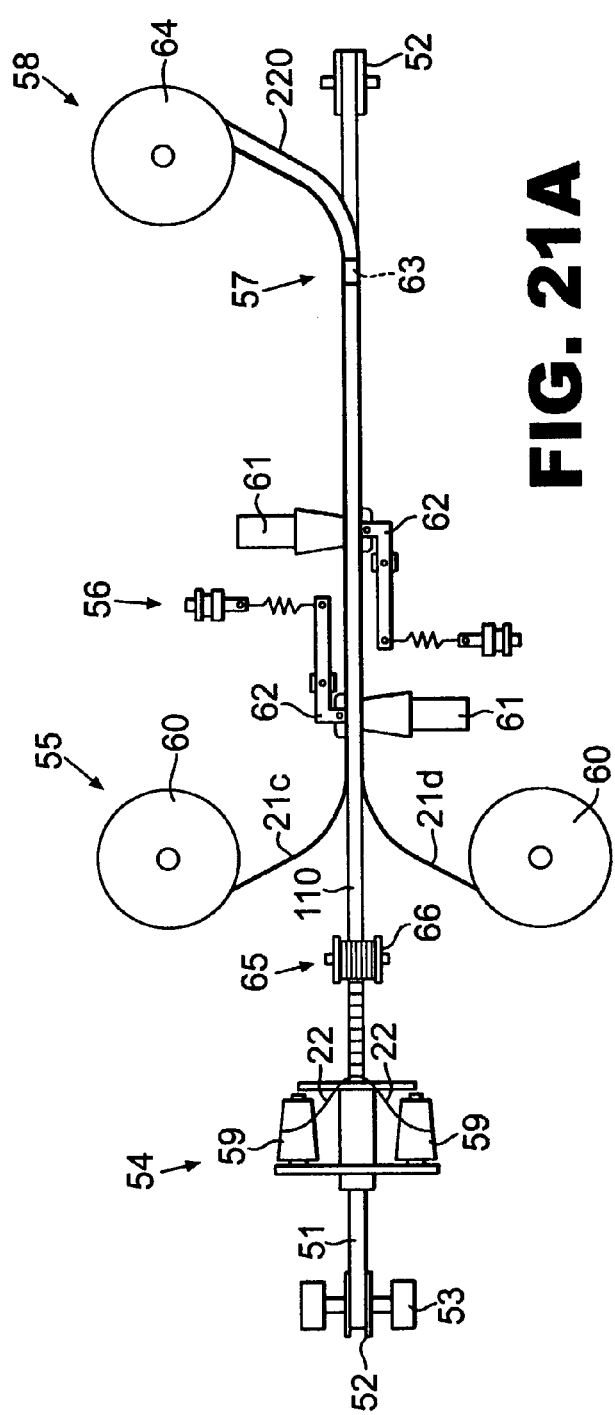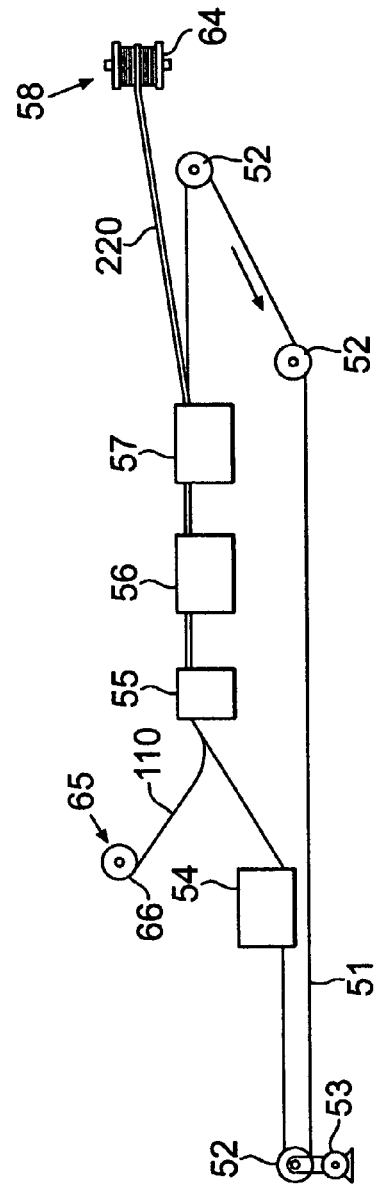

WEATHERSEALS

The present invention relates to weatherseals, and particularly to pile weatherseals useful in controlling moisture and air infiltration via windows and doors, or as resilient backing members for panels, such as may be used in automotive dashboards, or in guiding webs, such as paper, moving through machines, such as printers and copiers, or for discharging buildup of static charge on such webs, sometimes called electro charging or cleaning uses for an electrophotographic apparatus (with conductive piles and conductive base strips), or as a cleaning brush for a head of cleaner. The term "weatherseals" as used herein should be deemed to include members for any of such applications.

Weatherstripping has been made by winding pile on an endless band, attaching backing strips to the pile wound across the ends of the band, and then slitting the pile to provide a pair of weatherstrippings having pile extending upward from the backing strips. Each of the pairs of weatherstripping has been used individually to seal inter-engaging surfaces, for example, between the moving sash and the frame of a window. The pile has resilience and restores from bent to upright position as when the sash separates from the frame of the window. Such weatherstripping and methods of making same are described in U.S. Pat. No. 4,302,494, issued Nov. 24, 1981 to Robert C. Horton. Improvements to such weatherstripping and weatherstripping fabrication methods which provide for the introduction of fins to control air and moisture infiltration through the pile, either on the inside or outside thereof, are described in Johnson et al., U.S. Pat. No. 5,338,382, issued Aug. 16, 1994, and Johnson, U.S. Pat. Nos. 5,807,451, issued Sep. 15, 1998 and 5,817,390, issued Oct. 6, 1998.

In an International Patent Application No. PCT/US03/34393 filed by inventors hereof, on Oct. 30, 2003, there is described cushioning members for guiding and controlling the movement of shutters and panes, which utilize members made in a weatherstripping apparatus, such as described in the above-referenced patents. However, the pile is not slit on both sides of the endless band. The base members are disposed opposite to each other and the pile therebetween provides a cushion. FIG. 1 shows cushioning members 20 fixed to a guide groove 15 of a support frame through which a shutter 14 moves in a direction perpendicular to the plane of the drawing. A similar frame and a similar pair of cushioning members are disposed along the opposite edge of the shutter 14. The base members 21 are installed in T-slots 17 in protrusions 18 extending inwardly from the sides of the frame 12. If the pile 22 is crushed and compressed when receiving external force as the shutter moves, the pile 22 generates resilient force to return to its original shape. The cushioning function of the members 20 is exhibited by the resilient force. The cushioning members are formed with cuts 23 laterally through half of the turns of the yarn while on the endless band, whereby the resiliency and the resistance presented by the cushioning members are controlled to provide a proper balance of resilience and resistance to the movement of the shutter so as to guide the shutter and reduce vibration and noise emanating from the shutter when either it is rolled up, or in response to wind or rain.

The above-identified International Patent Application also illustrates an example in which a cushioning member 20 is used as a supporting member for supporting the sides of a screen or pane 70 as may be used in a door or window. FIG. 2 shows the cushioning member 20 along one end of the pane 70. A similar assembly including a cushioning member 20 is located along the opposite end of the screen pane 70. There are two side frames 71 of a door or window, only one of which is shown in FIG. 2. Each side frame 71 has a groove along which the pane 70 may move in a direction into or out of the plane of the drawing. A recess is formed in each of the inner sides of a vertical groove 72 in the frame 71. The cushioning members 20 are fixed in the guide groove by assembling their base members 21 in T-slots 73. Each side of the screen or pane 70 can be moved up and down along the grooves 72. Each side along the edge of the screen 70 is inserted into a cut 23 of one of the cushioning members 20. The cut pile yarns 22 on opposite sides of the cut 23 hold the screen along the sides thereof which extend into the cut 23. The screen 70 can be lifted and lowered with its sides along its edges being held by the cushioning members 20 while sliding on the cut pile yarns 22. The cut pile yarns exert a cushioning force to suppress shaking of the screen frontwardly and rearwardly. The non-cut pile yarns 22 receive a side edge of the screen and exert a cushioning function to suppress shaking of the screen in a lateral direction between the side edges thereof.

It has been discovered in accordance with the invention that an improved weatherseal may be provided by orienting the base members between which the pile is connected in other relationships with respect to each other, such that a bow or arch, or even a loop, may be formed by the pile. This loop provides resiliency as well as controlling moisture and air infiltration laterally through the pile. When the pile is cut laterally partially therethrough, there is provided a cut pile section and a continuous pile section. When the bow or arch is formed, the cut pile section extends upwardly towards the apex of the bow or arch in tufts along the ends of the bow. These tufts provide a pile weatherstrip similar to the individual weatherstrips made by the methods described in the above-referenced patents. Thus, both the advantages of a resilient seal member and bendable pile member(s) are provided by the weatherseal. The weatherseals embodying the invention may be designed by cutting away the entire cut pile section, or cutting away only a portion of the cut pile section, thereby leaving no tufts or a single pile tuft along selected side of the bow or arch of the weatherseal. The backing strips may be disposed in the same plane in edge-to-edge contact or with the edges spaced to provide bows or arches with selected spans. Since the length of the span determines the resiliency of the seal member, a longer span may be desirable when providing a seal member backing a panel as in an automobile dashboard. By orienting the base members perpendicular to each other, a corner seal may be provided by the bow or arch against which the corner or edge of a window or door may be sealed. By orienting the base members in back-to-back relationship, a loop of pile is provided around the edges of the base strips. The later construction is especially suitable for providing a resilient guide and a static charge-dissipating device, when the yarn and/or the base strips are of conductive material.

Accordingly, it is the principal feature of the present invention to provide improved weatherseals.

It is another feature of the present invention to provide weatherseals having resiliency for affecting a cushioning function.

It is a still further feature of the present invention to provide weatherseals made of pile which present an arch or bow as well as tufts of pile so as to provide a compound sealing action.

The foregoing and other features and advantages of the invention as well as presently preferred embodiments thereof will become more apparent from a reading of the following description in connection with the accompanying drawings in which:

FIG. 18E is a sectional view of the weatherseal and frame of FIG. 18D with respect to a photosensitive drum and support housing for the frame;

FIGS. 19A and 19B are respectively schematic diagrams of apparatus for manufacturing weatherseals of FIG. 3 in plan view and side view, respectively;

FIGS. 20A and 20B are schematic views of apparatus for manufacturing weatherseals shown in FIG. 4 in plan view and side view, respectively;

FIGS. 21A and 21B are schematic diagrams of apparatus for making the weatherseal of FIG. 5 in plan view and side view, respectively.

Figure 1:
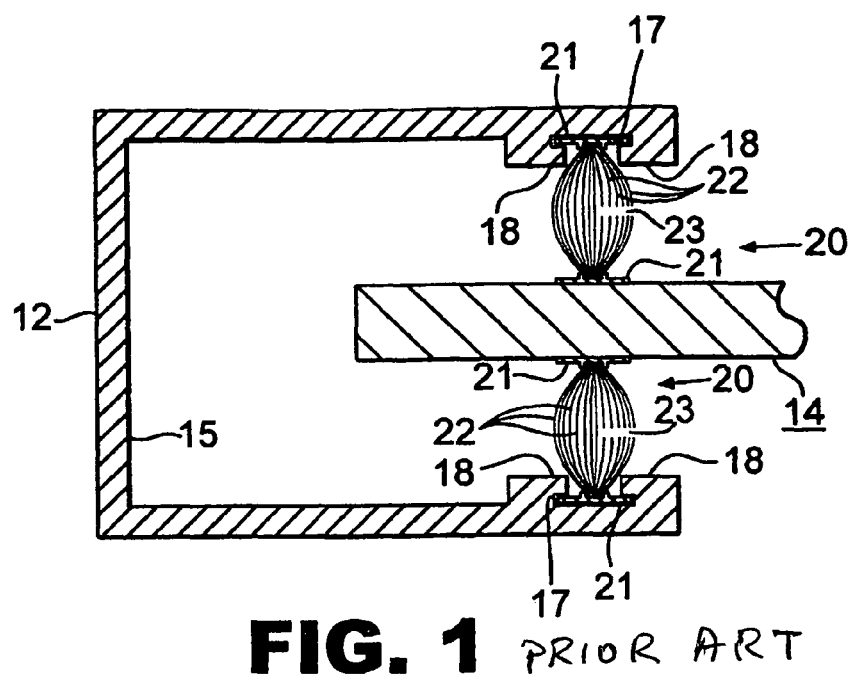
FIG. 1 is a sectional view of cushioning members and a cushioning member assembly for controlling the movement of a shutter which is taken from the above-identified International Application and which has been described above.
Figure 2:
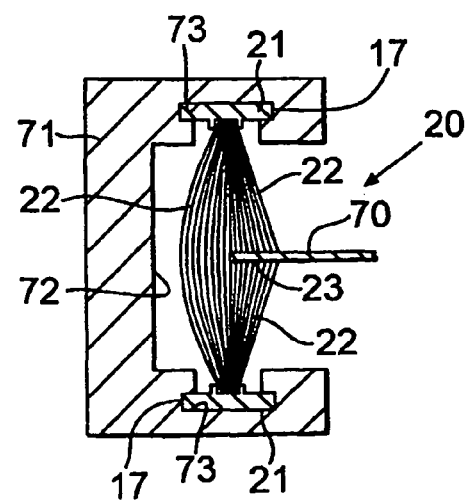
FIG. 2 is a sectional view of another assembly including a cushioning member for controlling the movement of a panel also taken from the above-identified International Application and which is described above.
Figure 3:
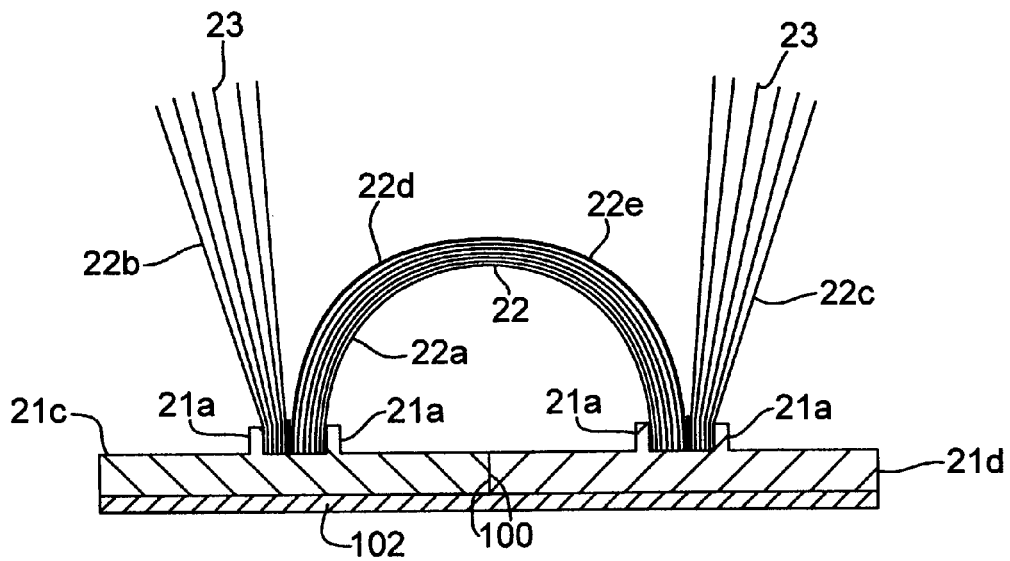
FIG. 3 is cross-sectional view through a weatherseal and perpendicular to the length thereof, it being understood that the weatherseal may be made in any desired length.

Referring to FIG. 3 there is shown a weatherseal having base members or strips 21c and 21d which are disposed in the same plane and assembled so that their edges 100 are touching. A tape or band 102 may assemble the base members together. The band 102 may be of Typar, a laminated nonwoven film, e.g., 12 mil thick, manufactured by Reemay, Inc. of Tennessee, USA. The pile 22 has a continuous section 22a and a cut section 23. These sections are attached, preferably by ultrasonic welding at the ends of the pile in a directing or guiding channel formed between ridges 21a on each of the base members 21c and 21d.

Because of the orientation of the backing, the continuous pile section 22a is formed into an arch or bow, which in the case where the backing members are in the same plane, is semi-cylindrical (semi-circle in the cross-section of FIG. 3). The cut section provides pile tufts or brushes 22b and 22c. The pile section 22a provides a bow or arch 22e (hereinafter referred to as an arch) having an outside surface 22d that provides the sealing surface when engaged by a member presealed, such member 104 being shown for example in FIG. 3A.

The arch is resilient and compresses when engaged by the member 104 and returns to its arch shape when member 104 is removed. The compressibility or resilience of the arch is selected by selecting the material, the diameter and the density (fibers per inch along the pile) of the pile. Preferably, plastic, such as synthetic resins, may be used for the pile fiber or yarn material and for the backing members. Preferably, the same resin is used. The preferred resin is polypropylene, but other olefinic resins, such as ultra high polymer, polyethylene, aliphatic polyamides, aromatic polyamides, acrylic resins, such as polyacryl ester resins, or polyethylene, terephtalate fluorocarbon resins etc. may be used. The yarn may be a single or multi-filament strand, formed by twisting together a plurality of filaments.

Figure 13:
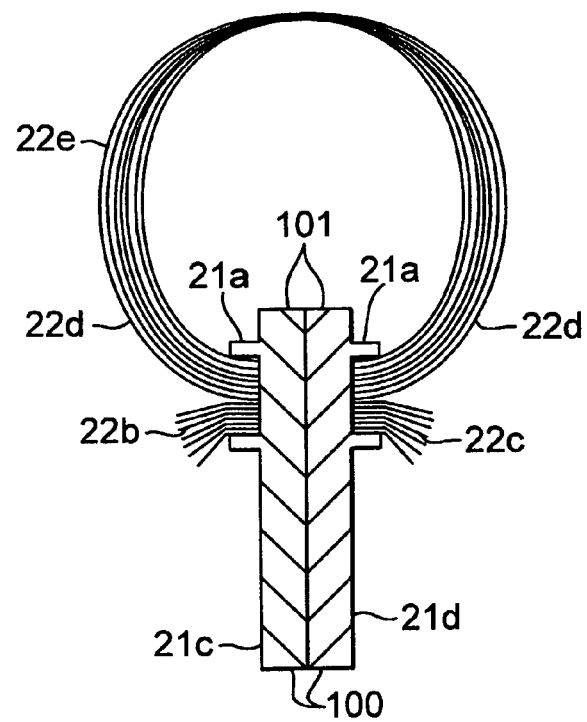
FIG. 13 is a sectional view through a weatherseal in accordance with another embodiment of the invention where the backing or base members are disposed in back-to-back relationship so as to form the continuous pile section into a loop.

By way of example, the weatherseal yarn may be 1200 Denier polypropylene fiber with 84 filaments in one yard strand, but other yarn may be used between 1000-2000 Denier or of other numbers of filaments per yard strand. The backing strips may be approximately 0.03 inch solid polypropylene. The connection between the ridges 21a may be in the center of the width of the ⅛ strips, or off-center as shown in FIG. 13. The height of the pile tufts or brushes 22b and 22c may be ⅜ inch. Arch 22e diameter may be ¾ inch, and the height of the arch may be ½ inch. Other dimensions may be selected in accordance with the desired application for the weatherseal. The desired resiliency of the seal provided by the weatherseal is obtained by the selection of the material, such as by denier and/or filament count of the fiber making up the pile 22, and/or the density of such fibers in the weatherseal.

Figure 3A:
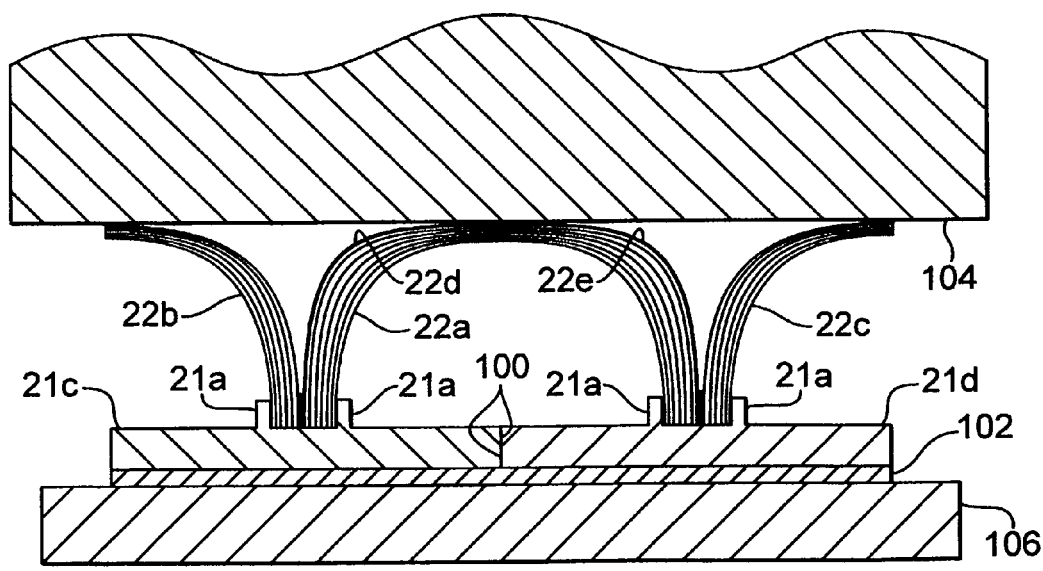
FIG. 3A is a sectional view of a weatherseal such as shown in FIG. 3 assembled to a framework and providing a seal against a member movable towards the framework into engagement with the seal.

As shown in FIG. 3A, the member 104 is movable toward and away from a framework to which the tape or bonding element 102 connecting the base members 21c and 21d are attached. The arch 22e is compressed and its outside surface 22d provides a sealing surface. Seals are also provided by the cut pile tufts or brushes 22b and 22c.

Figure 3B:
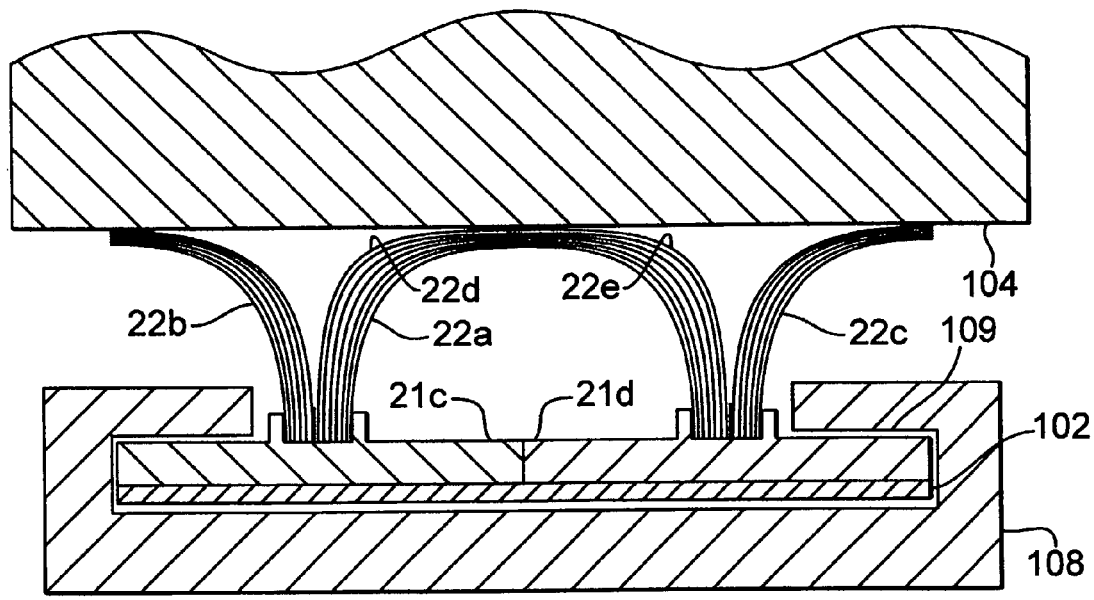
FIG. 3B is a cross-sectional view similar to FIG. 3A showing the weatherseal in a T-slot in a framework having such a slot.

FIG. 3B shows the member 104 movable towards a frame 108 having a T-slot 109. The base or backing strips 21c and 21d connected by the tape 102 are disposed in the T-slot and held therein against horizontal and vertical movement. There may be sufficient friction between the walls of the T-slot and the sides of the base strips 21c and 21d and the back thereof to limit longitudinal movement in a direction along the length of the weatherseals.

The weatherseal shown in FIG. 3 may be made by the apparatus illustrated in FIGS. 19A and 19B.

Figure 4:
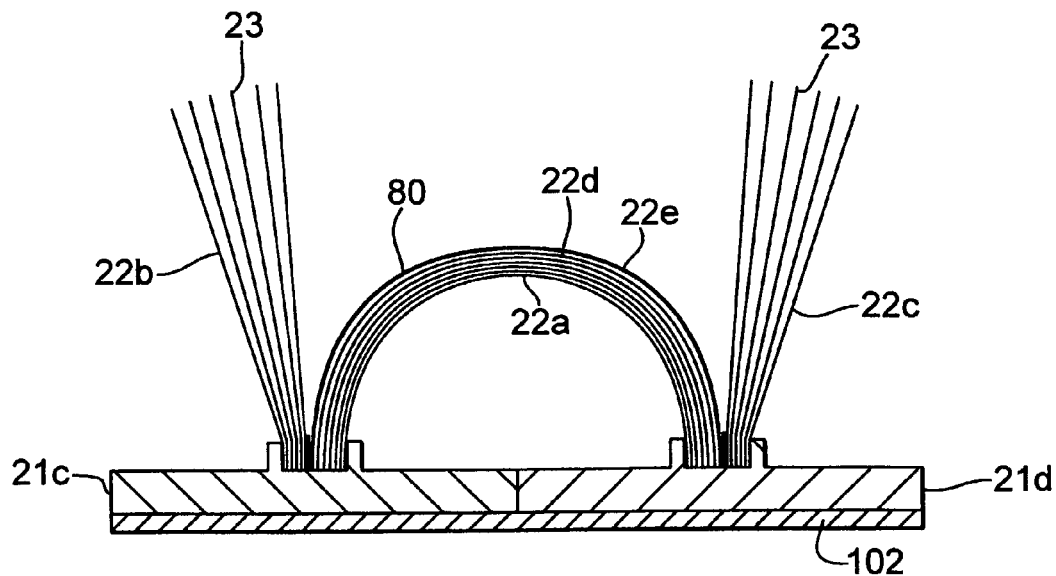
FIG. 4 is a sectional view similar to FIG. 3 of a weatherseal which is provided with a fin seal over the arch or bow pile thereof.

Referring to FIG. 4 there is shown a weatherseal similar to the seal illustrated in FIG. 3, except that a sheet or film of fin material 80 is disposed over the arch 22e in engagement with the outside surface 22d of the pile section 22a. This fin material may be the same as used to provide fins inside or outside the pile in the conventional pile weatherstripping illustrated in the above-referenced patents. The fin 80 extends between the base strips 21c and 21d and for the entire length of the arch 22e and the weatherseal. The pile from the cut section 23 are disposed along the edges of the fin 80. Desirably, the fin 80 is of the same material, preferably polypropylene, as the fibers making up the arch 22e and the pile 22b and 22c. Since the fin 80 may be a continuous sheet, the sliding friction coefficient thereof may be less than the friction coefficient presented by the outside surface 22d of the arch 22e. The fin may be less than 0.003 inch thick but may be thicker so as to enhance or at least not substantially diminish the resilience and the capability of the arch to resume its arch shape after being compressed.

Figure 20C:
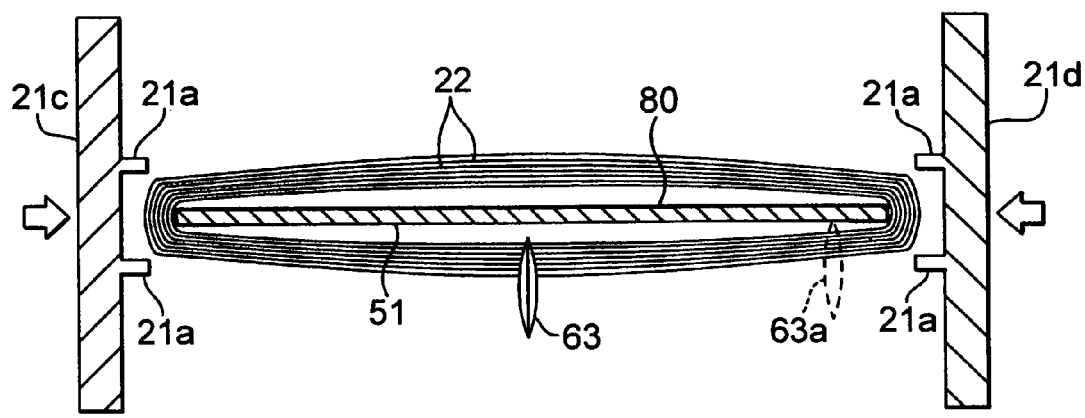
FIG. 20C is a cross-sectional view of the weatherseal at the pile cutting step of FIGS. 20A and 20B.

The weatherseal may be manufactured with the fin over the pile arch 22e by the apparatus illustrated in FIGS. 20A, 20B and 20C.

Figure 5:
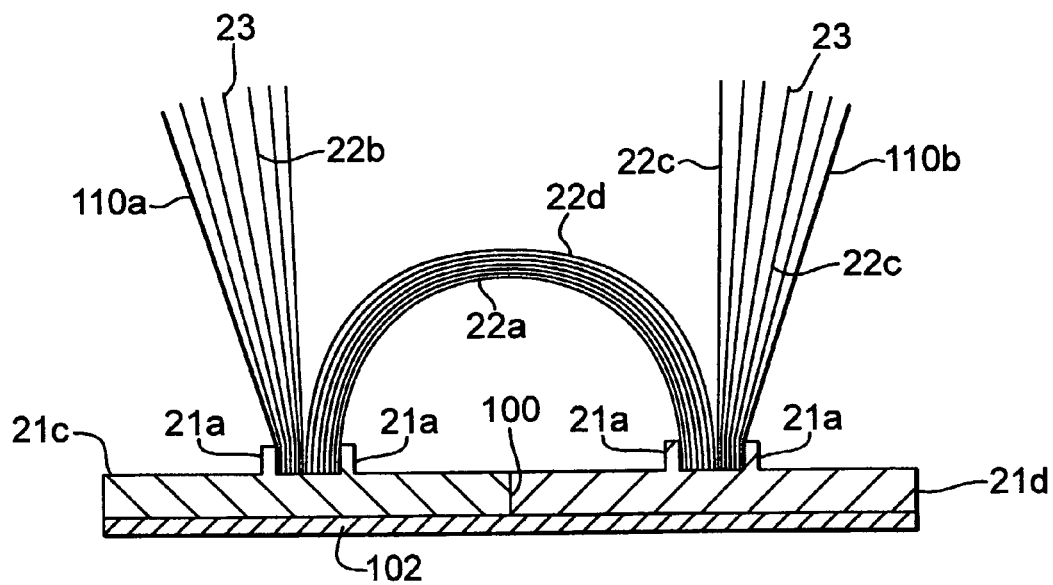
FIG. 5 is a sectional view similar to FIG. 3 showing a fin sheet or shield along the outside edges of the upstanding pile brushes of the weatherseal.

Referring to FIG. 5, there is shown a weatherseal similar to the weatherseal shown in FIG. 3. Additional fin (or fin shields) 110a and 110b are provided on the outside of the cut pile sections 23. These shields much like outside fins in the conventional weatherstrip illustrated in the Johnson et al. and Johnson patents referenced above improved the resistance of the seal to air and moisture infiltration. The fin material may be polypropylene sheet material. The fins 110a and 110b may be applied in the manufacture of the weatherseal shown in FIG. 5 by apparatus illustrated in FIGS. 21A, 21B and 21C.

Figure 6:
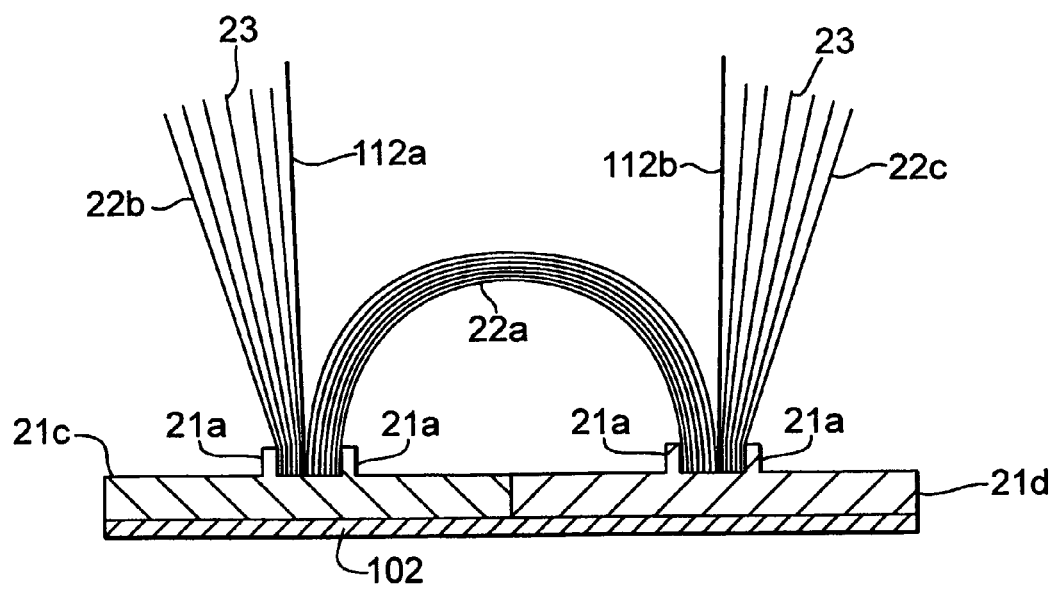
FIG. 6 is a sectional view similar to FIG. 5 showing fins on the inside of the upstanding pile brushes of the weatherseal.

Referring to FIG. 6, there is shown a weatherseal similar to that illustrated in FIGS. 3 and 5 except that center fins 112a and 112b are utilized. The apparatus used to make the inside fin weatherseal may be similar to the apparatus illustrated in FIGS. 21A, 21B and 21C except that the fin material is disposed on the inside of the cut pile section 23 between the band 51 and the pile and is cut with the pile as the pair of cut piles 22b and 22c are formed.

Figure 7:
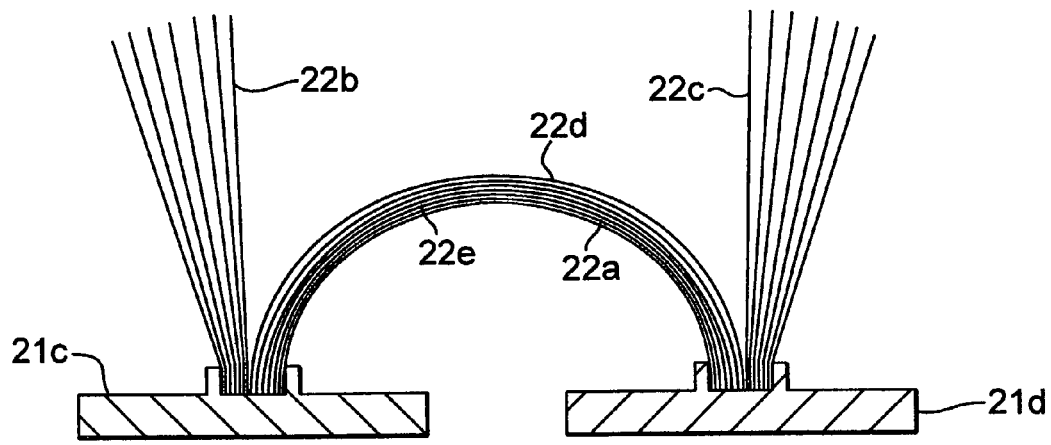
FIG. 7 is a sectional view similar to FIG. 3 of another embodiment of the weatherseal provided by the invention where the bow or arch is enlarged by the spacing the edges of the base members of the weatherseal from each other.

Referring to FIG. 7, there is shown weatherseal made from a longer bundle or pile of yarn than is the case with the weatherseal shown in FIG. 3. The base strips 21c and 21d are in the same general plane but are spaced from each other to form a longer arch 22e. The cut piles 22b and 22c on opposite sides of the arch may be longer than those shown in FIG. 3. It will be appreciated that more than one center cut may be made through the cut pile section so as to shorten the length of the cut piles 22b and 22c.

Figure 7A:
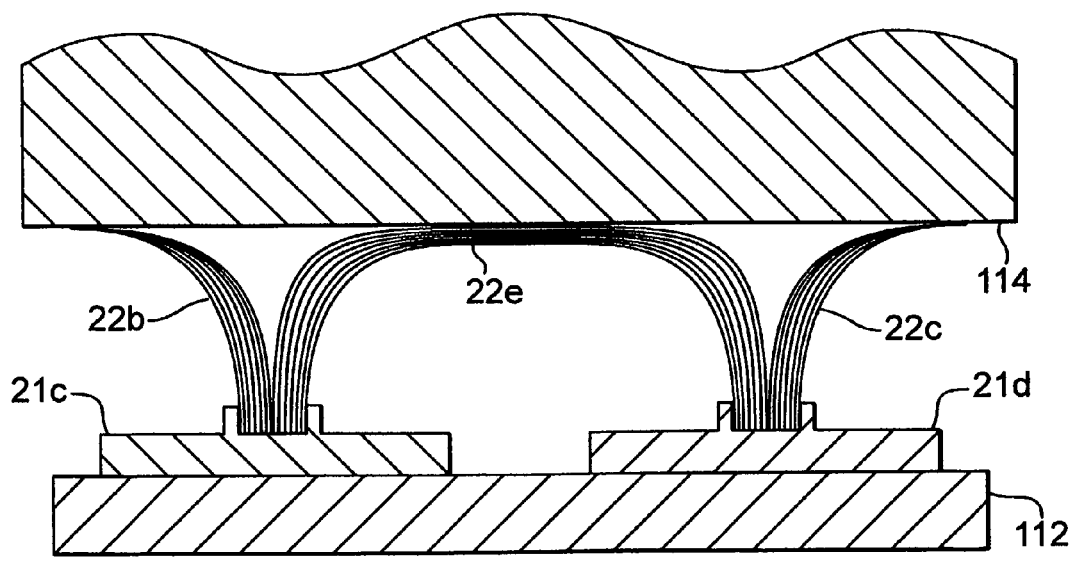
FIG. 7A is a sectional view showing the weatherseal illustrated in FIG. 7 attached to a framework and providing sealing of a member movable with respect to the framework.
Figure 7B:
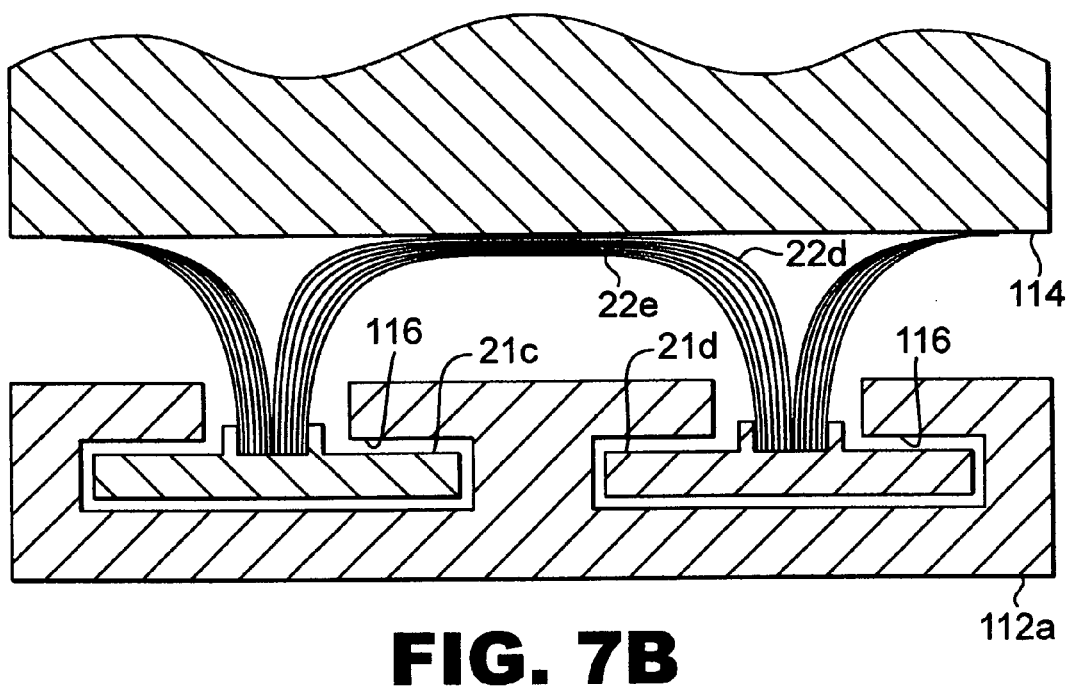
FIG. 7B is a sectional view similar to FIG. 7A where the framework contains T-slots holding the backing or base members of the weatherseal in spaced relationships.

FIG. 7A shows the weatherseal of FIG. 7 attached as by adhesive to a framework member with the base strips 21c and 21d in the spaced relationship illustrated in FIG. 7. A member 114 is movable towards the frame 112 which compresses the pile arch 22e and compresses the pile brushes 22b and 22c. FIG. 7B is similar to FIG. 7A except that a frame member 112a has T-slots 116 which capture the base strips 21c and 21d and limit the lateral vertical and longitudinal movement thereof. Optionally, the weatherstrip of FIG. 7 may have a fin 80 as shown in FIG. 4.

Figure 8:
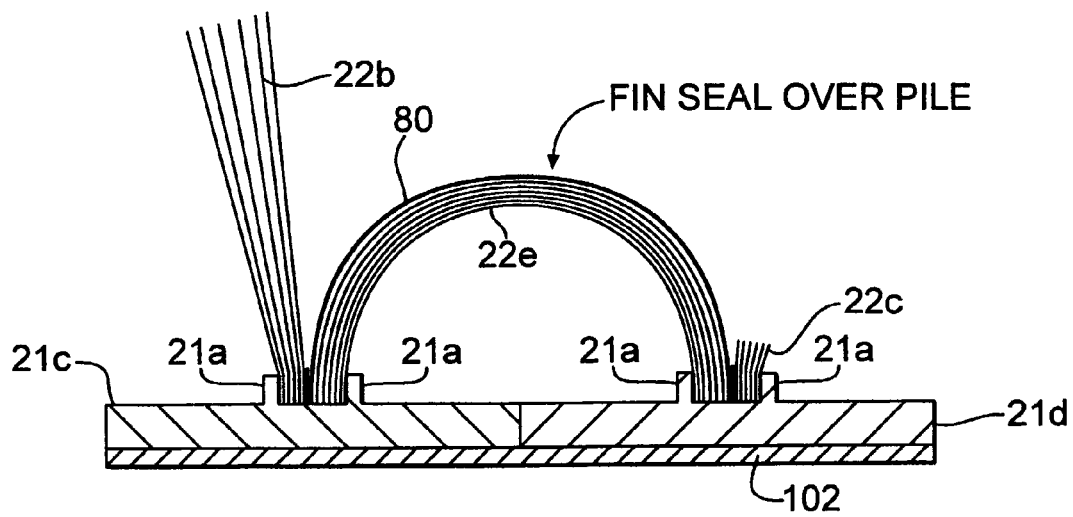
FIG. 8 is a sectional view similar to FIG. 4 of another embodiment of a weatherseal provided by the invention where only one cut pile tuft or brush is provided along the end of the bow or arch of the weatherseal.

Referring to FIG. 8 there is shown a weatherseal similar to the weatherseal of FIG. 4. A pile brush section 22b is shown on one side of the arch 22e. The other pile brush 22c is sheared away and does not play a part in the sealing function of the weatherseal. The pile 22c may be sheared through the use of an additional cutting blade positioned close to the base strip 21d during manufacture of the pile on the apparatus illustrated in FIGS. 20A, 20B and 20C. The other cutting blade 63a is shown in dashed lines in FIG. 20C. Removal of one of the side piles may be desirable in certain applications such as in ceilings, swinging doors or windows (casements). The arch pile and the other pile brush 22b contribute to the sealing function. Optionally, the weatherstrip of FIG. 8 may be provided without fin 80, as shown in FIG. 3, with the pile brush 22c sheared away.

Figure 8A:
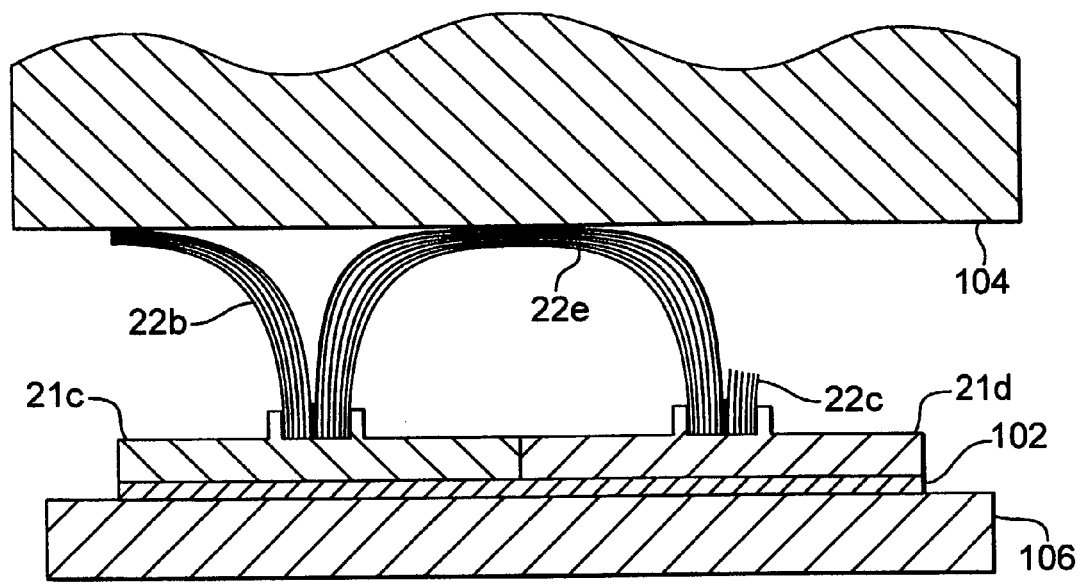
FIG. 8A is a sectional view showing the weatherseal of FIG. 8 assembled to a framework and providing a seal against a member movable with respect to the framework into engagement with the weatherseal.

FIG. 8A shows the weatherseal of FIG. 8 attached to a framework 106 as by adhesive. A closing member 104 compresses the arch 22e and one of the pile brushes 22b, but the sheared pile brush 22c is not engaged by the closure member 104.

Figure 8B:
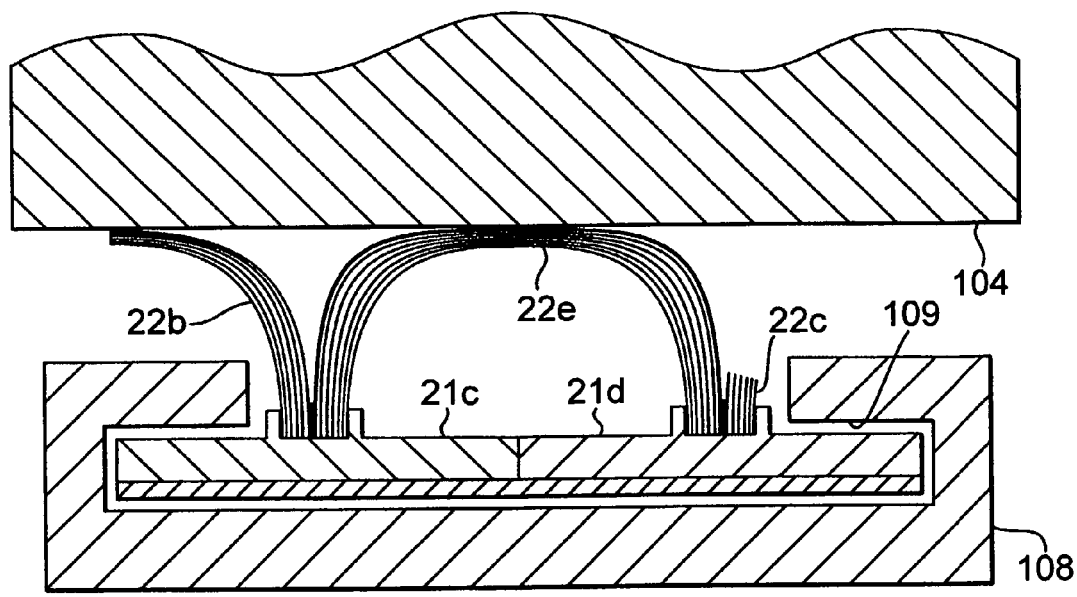
FIG. 8B is a view similar to FIG. 8A where the framework has a T-slot for holding the backing strips and assembling the weatherseal.

FIG. 8B is similar to FIG. 8A except that the base strips 21c and 21d are captured in a T-slot 109 in a frame 108 as described in connection with FIG. 3B. As discussed in connection with FIG. 8A, the sheared pile 22c is not used to provide the sealing function.

Figure 9:
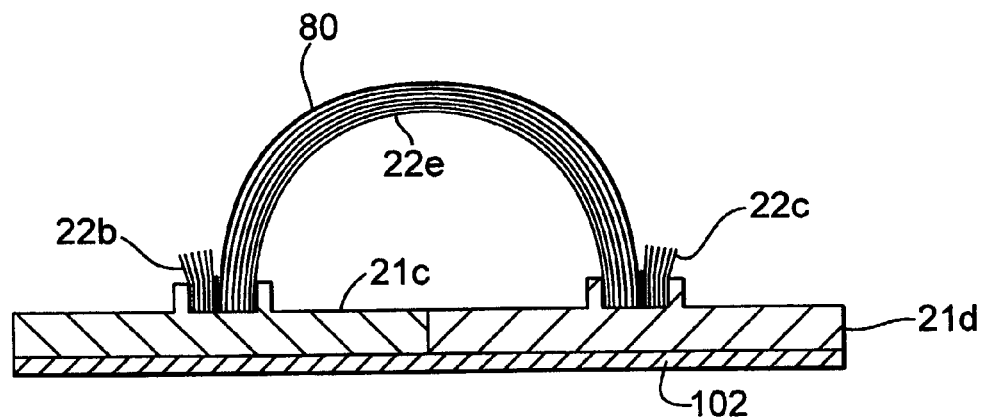
FIG. 9 is a sectional view similar to FIG. 4 wherein the cut pile section is sheared so as to remove the cut pile tufts shown in FIG. 4.

Referring to FIG. 9, there is shown a weatherseal similar to that illustrated in FIG. 4. Both pile brushes 22b and 22c in the cut pile section are sheared. A pair of cutting blades may be used each adjacent to a different one of the base members 21c and 21d so as to shear and cut away the entire cut pile section. Blade 63a may represent one blade of this pair near base member 21d, while the second blade of this pair may be provided by repositioning blade 63 near base member 21c similar to that of the position of blade 63a with respect to base member 21d.

In the weatherseal shown in FIG. 9, only the arch 22e provides the sealing function. A still lower closing force than the weatherseal shown in FIG. 8 is provided. Nevertheless, the arch, in this case covered by the seal 80, provides a significant contact area for sealing purposes. The fin 80 is optional and its use depends upon the air and moisture infiltration and frictional characteristics which are specified for the weatherseal.

Figure 10:
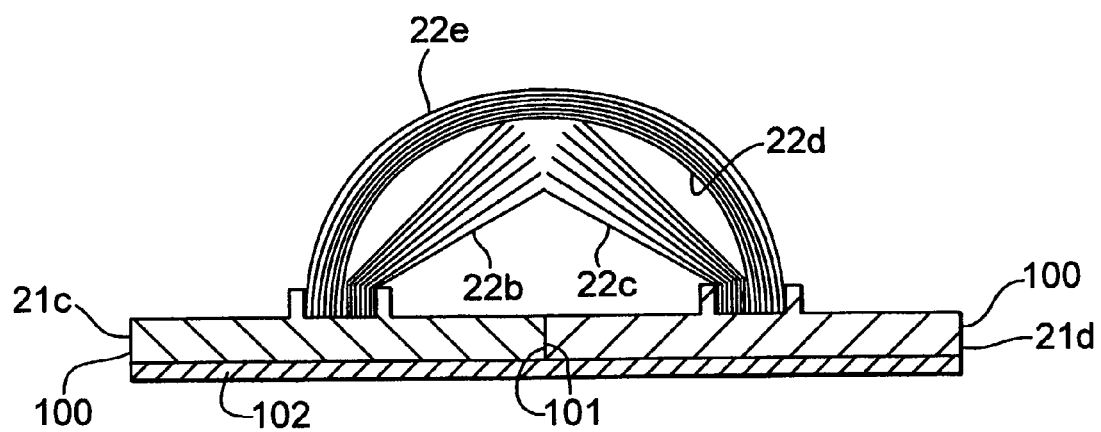
FIG. 10 is a sectional view of a weatherseal in accordance with another embodiment of the invention wherein the cut pile section is on the opposite side of the weatherseal from the side having the cut pile section as shown in FIG. 3 thereby putting the cut pile tufts or brushes inside the bow or arch.

Referring to FIG. 10, there is shown a weatherseal similar to that shown in FIG. 3 where the pile brushes 22b and 22c are disposed inside the arch 22e. This may be accomplished by turning the base members 21c and 21d 180° from their location shown in FIG. 3 so that the ends 101 are opposite to the ends 100 of the base members 21c and 21d and come into contact with each other. Base members are assembled in same plane using the backing 102 which bonds them together. The weatherseal of FIG. 10 may have higher elastic force due to increased stiffness because the pile brushes 22b and 22c are inside the arch 22e. These brushes 22b and 22c also do not participate in the sealing action and it is not necessary to shear them off as shown in FIG. 9 so as to get them out of the way of the closure member which engages the arch 22e.

Figure 11:
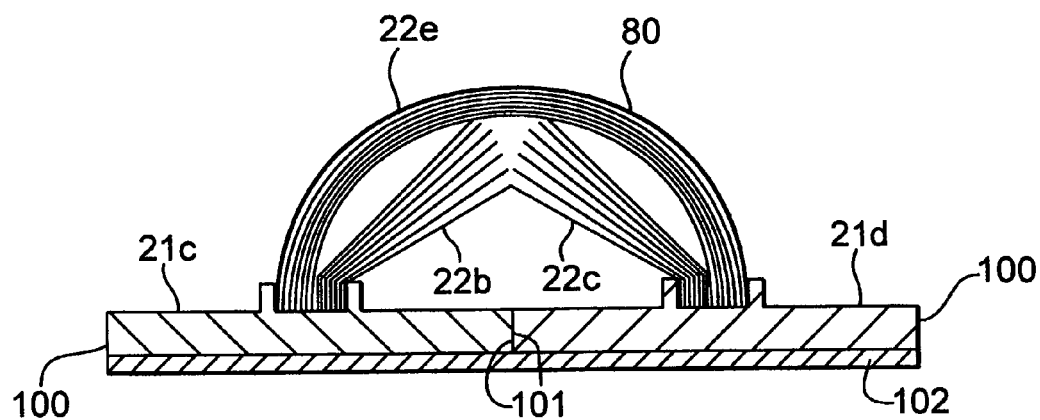
FIG. 11 is a sectional view similar to FIG. 10 showing a fin seal sheet over the outside of the bow or arch similar to the fin seal sheet shown in FIG. 4.

FIG. 11 is similar to FIG. 10 but shows the use of the fin sheet 80 providing the seal over the arch 22e. This may be provided by reorienting the base members 21c and 21d of the weatherseal of FIG. 4 in same manner as weatherseal of FIG. 10 is formed by reorienting the weatherstrip of FIG. 3.

Figure 12:
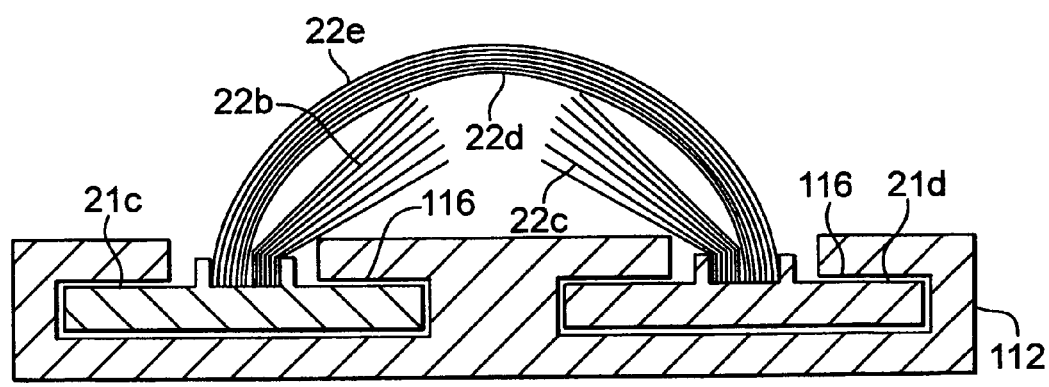
FIG. 12 is a sectional view of a weatherseal in accordance with another embodiment of the invention; this weatherseal being similar to the weatherseal shown in FIG. 10, with the bow or arch being larger in diameter and the backing or base members assembled in a framework having T-slots which are separated laterally from each other.
Figure 12A:
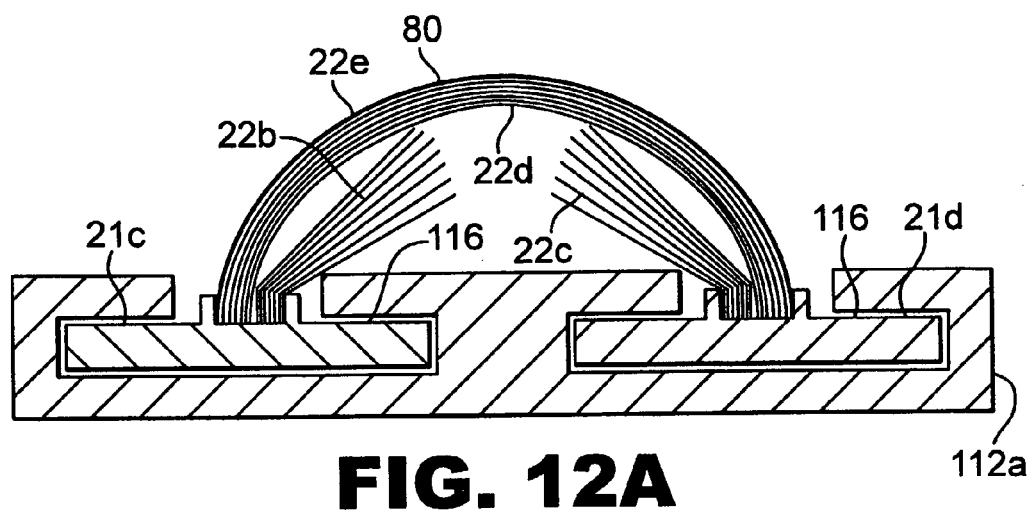
FIG. 12A is a sectional view of a weatherseal similar to FIG. 12 showing a fin seal sheet over the outside bow or arch similar to the fin seal sheet shown in FIG. 4.

FIG. 12 shows a weatherseal similar to FIG. 10 having a longer arch 22e provided by a longer bundle of pile extending between the base strips 21c and 21d. The pile brushes 22b and 22c are also separated by each other thereby supporting the arch and increasing its stiffness and elastic force. The weatherstrip of FIG. 12 may be formed by turning base members 21c and 21d such that the outside surface 22d of arch 22e of FIGS. 7, 7A and 7B forms the inside surface of the arch 22e of FIG. 12 when placed in T-slots 116. FIG. 12A is similar to FIG. 12 but shows the use of a fin sheet 80 over arch 22e.

Referring to FIG. 13, there is shown a weatherseal where the base members 21c and 21d are bonded together back-to-back relationship. Also the channels provided by the ridges 21a are closer to edge 101 and the other edge 100 of the base strips 21c and 21d. The arch 22e then forms a loop. The cut pile brushes 22c and 22b are sheared off and appear only as stubs at the ends of the loop.

Figure 14:
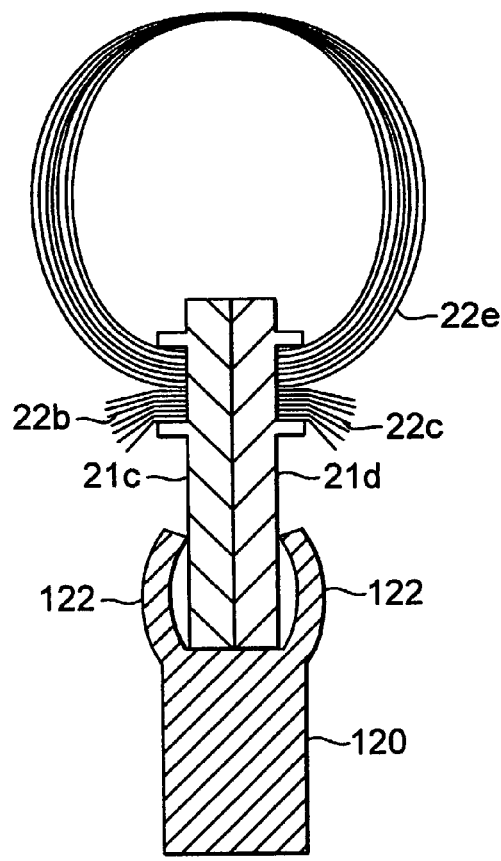
FIG. 14 is a sectional view of the weatherseal shown in FIG. 13 where the base members are clamped in a frame.

Referring to FIG. 14, there is shown a clamping strip 120 having sides 122 forming a slot which engages the front sides of the base members 21c and 21d of FIG. 13. These sides may be crimped together so as to clamp the weatherseal. This strip 120 may be a frame work against which a closure member moves against the arch loop 22d.

Figure 14A:
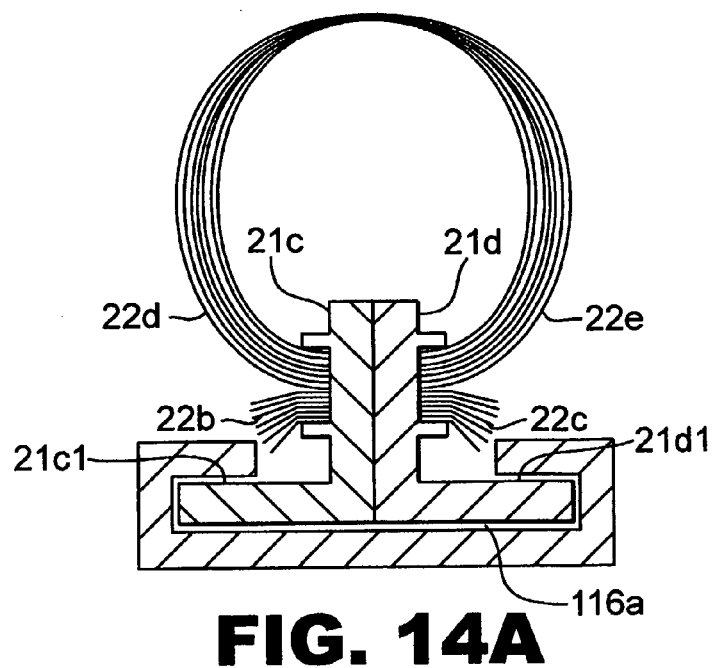
FIG. 14A is a sectional view through a weatherseal in accordance with another embodiment similar to the weatherseal of FIG. 3, but where the backing or base members are each "L" shaped and when in back-to-back relationship are insertable in a T-slot.

Referring to FIG. 14A, there is shown a weatherseal similar to the weatherseal of FIG. 13, but where each base member 21c and 21d is "L shaped" in cross-section. When the base members are bonded in back-to-back relationship, their "L" shaped legs 21c1 and 21d1, respectively, extend in opposite directions, such that the base members together form an upsidedown "T" shape in cross-section, which may be inserted in a T-slot 116a.

Arches without outside brushes as in FIGS. 9, 10, and 11 and arch loops as in FIGS. 13 and 14 are especially suitable for use as resilient guides for webs such as paper which moves continuously or in sheets in a machine. When the loops and the frame to which it is connected are conductive and connected to ground, the weatherseal provides a device for discharging electrostatic energy which has a tendency to collect on a moving web.

Figure 15:
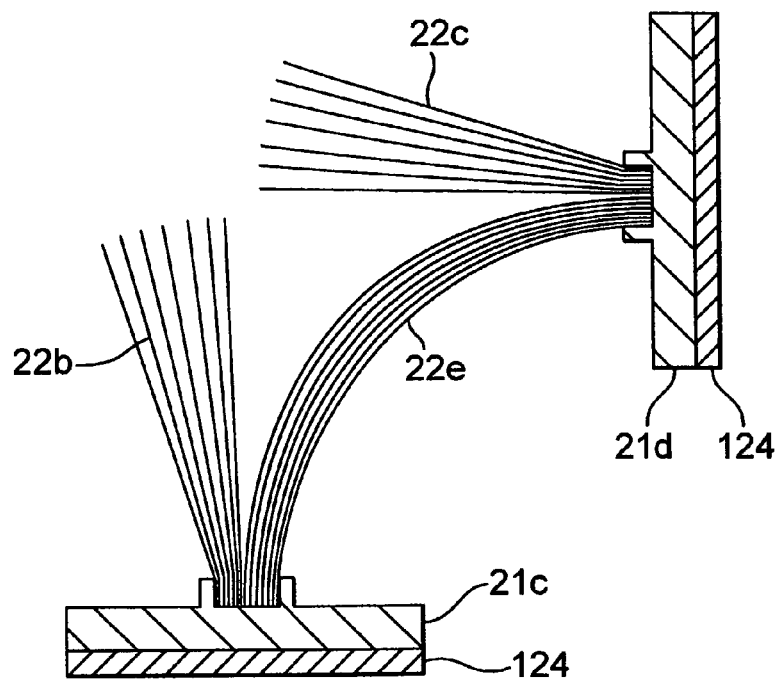
FIG. 15 is a sectional view of a weatherseal in accordance with still another embodiment of the invention where the base members are disposed at 90° to each other so as to provide a corner seal.
Figure 15A:
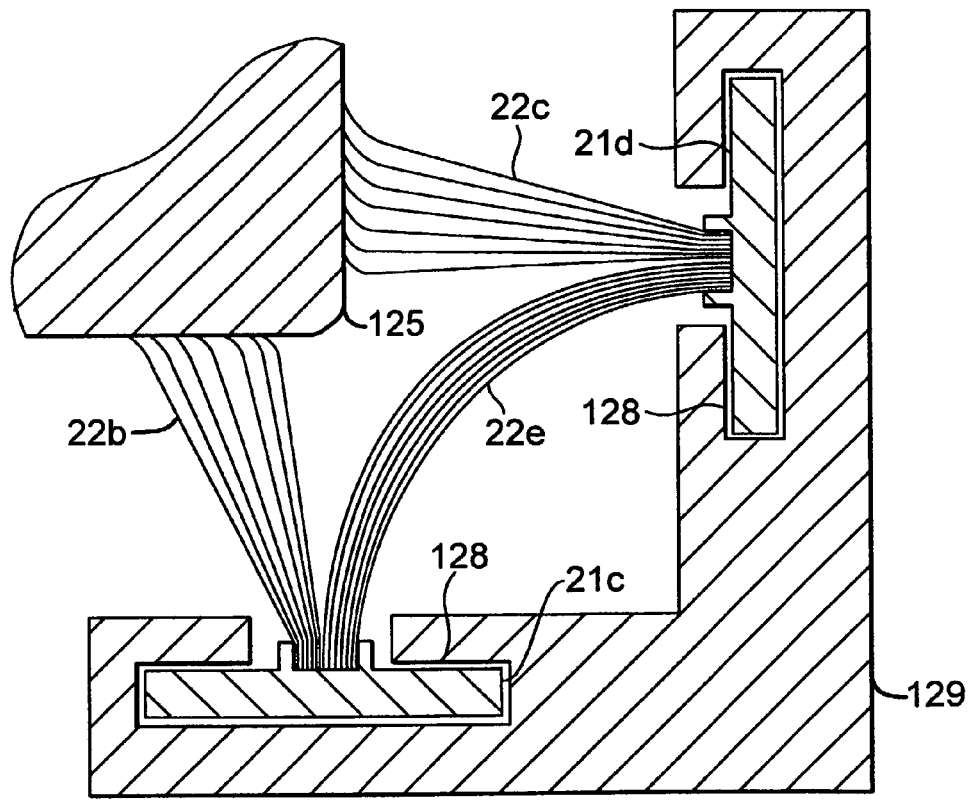
FIG. 15A is a sectional view of a weatherseal similar to that shown in FIG. 15 where the base members are disposed in a framework having T-slots at 90° with respect to each other.
Figure 15B:
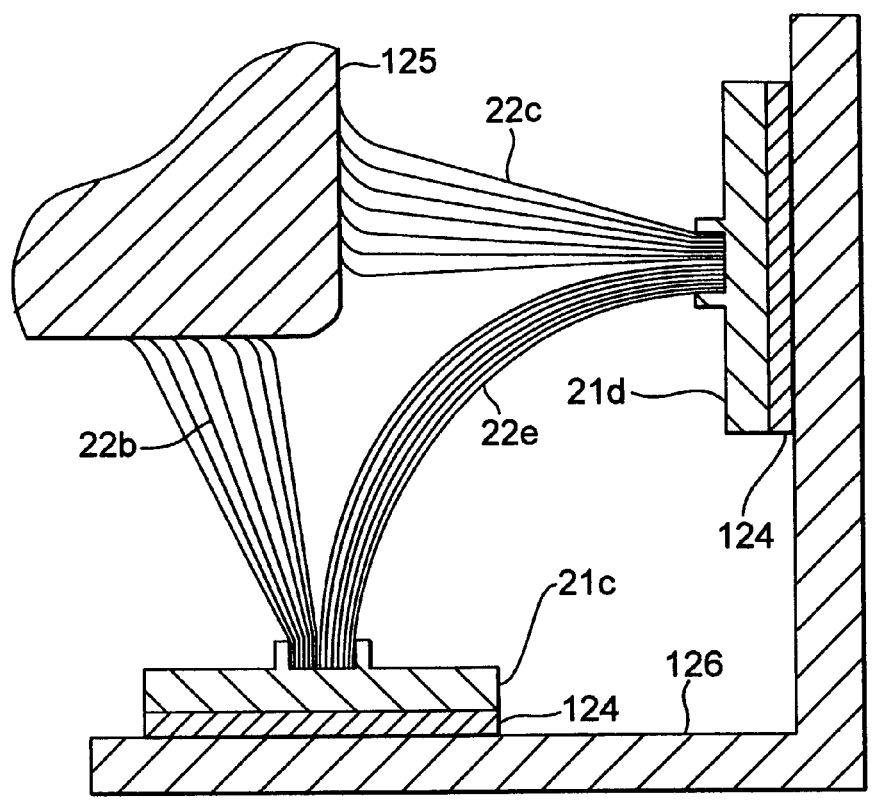
FIG. 15B is a sectional view similar to FIG. 15A where the base strips or members are connected to inside sides of an angle and bar having a 90° angle between the base strips by being adhesively attached thereto to the angled sides of the bar.

Referring to FIG. 15, there is shown a corner seal provided when the base members 21c and 21d are disposed 90° to each other. The arch 22e then faces the corner of a closure member to be sealed. The side pile brushes 22b and 22c engage the corner of the closure on opposite sides of the edge thereof. A full-sided adhesive backing 124 may be used to attached the base members 21c and 21d in 90° relationship to a frame work 126 which may be an angle bar as shown in FIG. 15B. FIG. 15A shows an angle frame 129 having T-slots 128 which capture the base strips 21c and 21d, and a closure member 125 engaging pile brushes 22b and 22c.

Figure 15C:
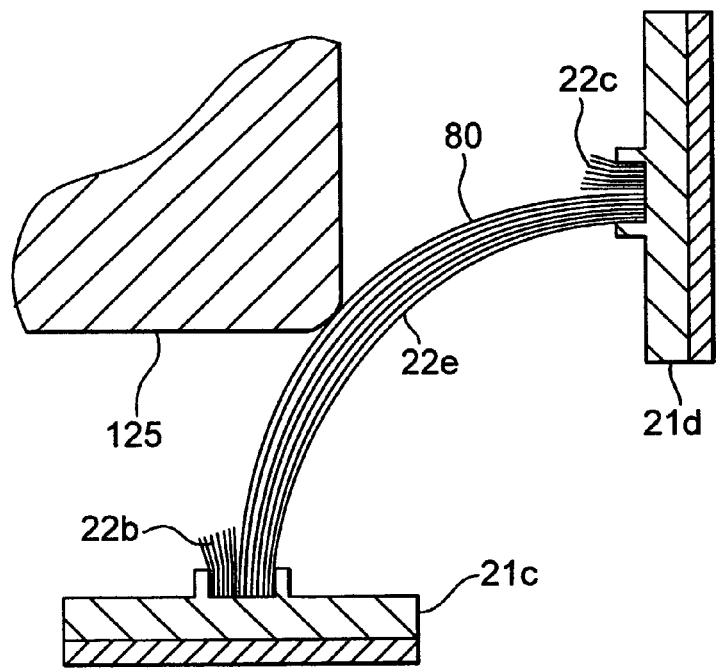
FIG. 15C is a sectional view of a weatherseal similar to the seal shown in FIG. 15 showing a fin sheet over the bow or arch where the tufts or brush portions of the cut section of the pile are removed and are not involved in the sealing action against a corner member which is engaged by the bow or arch of the weatherseal.

FIG. 15C shows the corner closure 125 in engagement with an arch 22e covered by a fin sheet 80, where the side brushes 22b and 22c are sheared off and do not engage the closure 125 where less sealing action and elastic force is desired.

Figure 16:
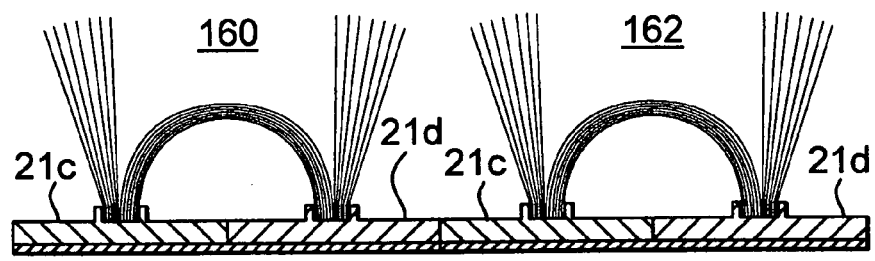
FIG. 16 is a sectional view of a weatherseal assembly operative as an energy absorbing device that provides a large sealing and cushioning surface area, which may be suitable as use as a compression member behind interior panels as, in the dashboard of automobiles to provide energy absorbing capability for safety purposes.
Figure 16A:
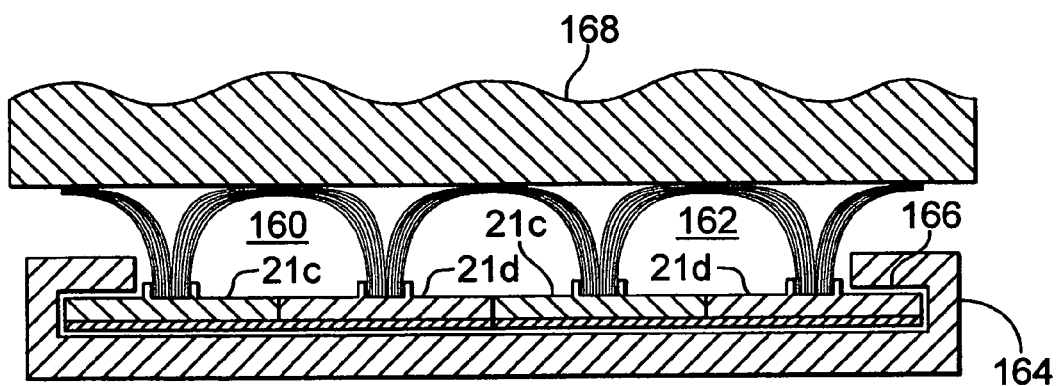
FIG. 16A is a view of an assembly including the weatherseal device shown in FIG. 16.

Referring to FIGS. 16 and 16A, there is shown an assembly of two side-by-side weatherseals 160 and 162. Each of these weatherseals may be like the weatherseal in FIG. 3. The weatherseals 160 and 162 may be mounted in a support frame work 164 having a T-slot 166 in which the weatherseal base members 21b and 21c are captured with their edges adjacent to each other where all of the weatherseals 160 and 162 are in the same plane. An interior panel 168, such as presented by the dashboard of an automobile, moves in a direction toward and away from the frame work 164 and the weatherseals 160 and 162 provide a wide area seal and cushioning surface.

Figure 17B:
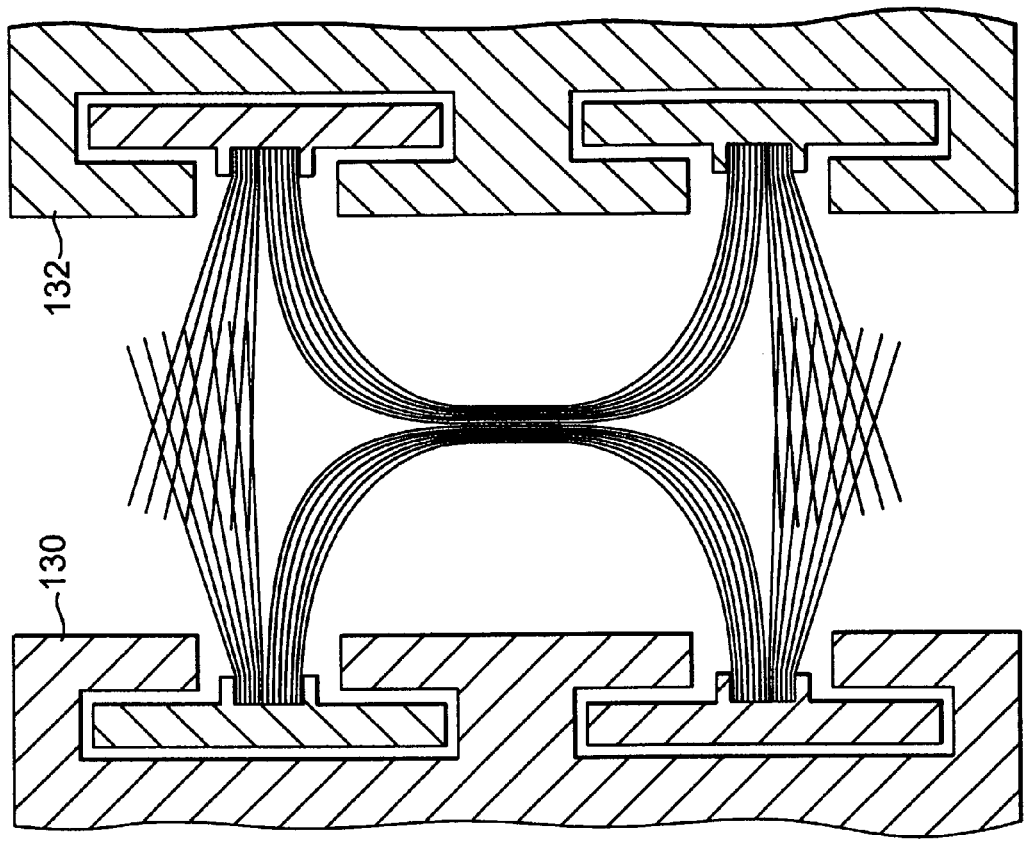
FIGS. 17A, 17B and 17C are sectional views illustrating different arrangements of weatherseals such as shown in FIG. 7 providing a single door seal, a double door seal, and a single seal to a casement window having a frame and a movable sash, respectively.
Figure 17A:
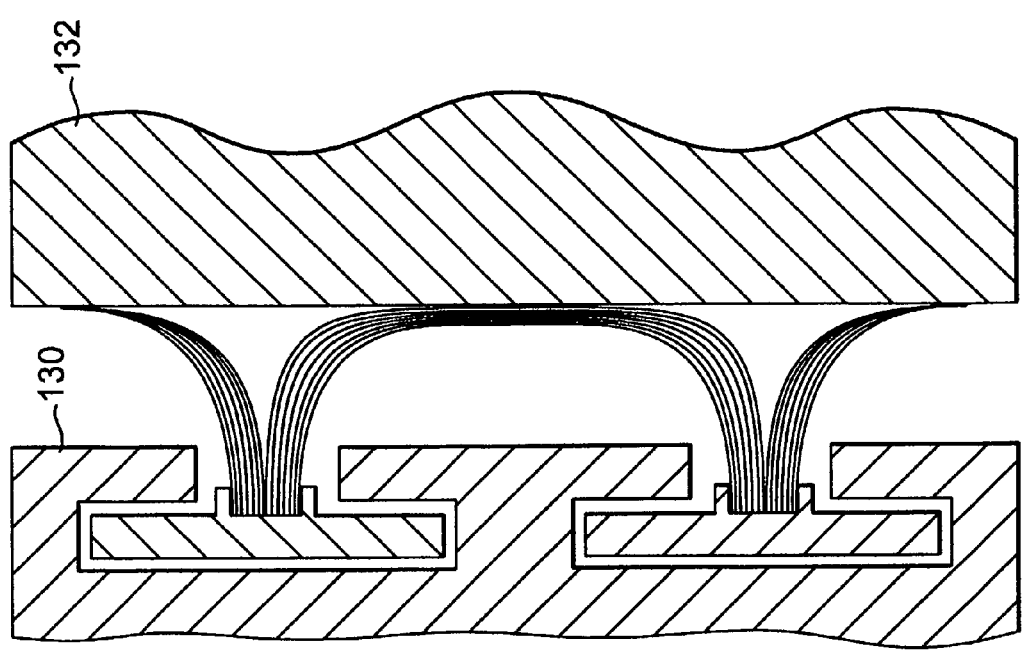
Figure 17C:
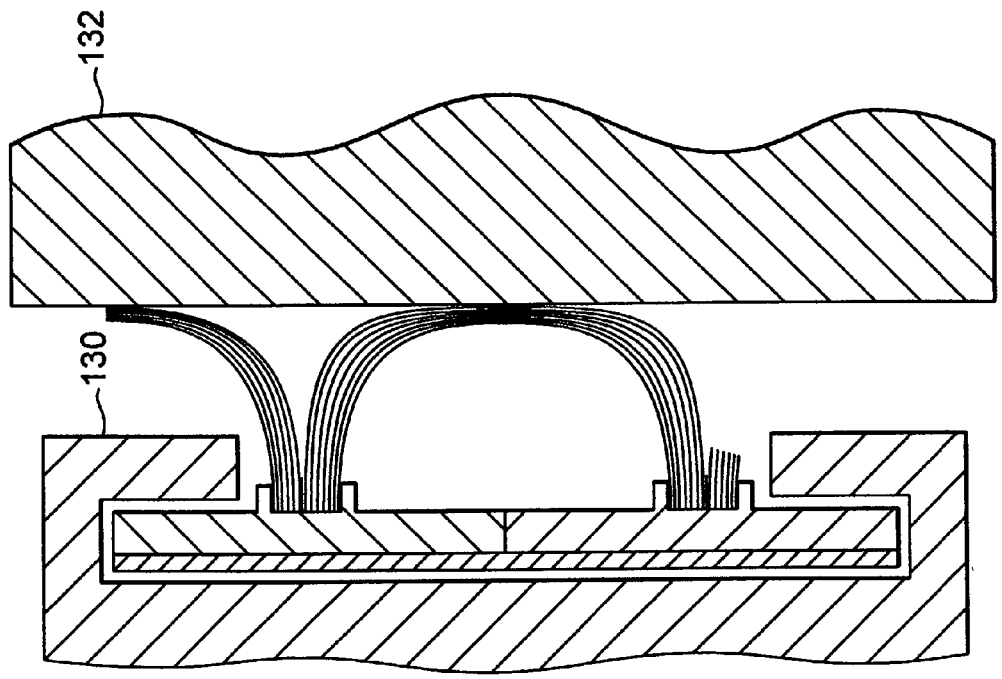

FIGS. 17A and 17B illustrates a door and door frame 130 and 132. The weatherseal of FIG. 7 (with or without fin 80 over arch 22e) is installed in T-slots, as in FIG. 7B, in the door frame 130 to provide a single door seal in FIG. 17A. In FIG. 17B, a pair of such weatherseals are installed in T-slots, as in FIG. 7B, of both the door 132 and door frame 130 to provide a double door seal. As shown in FIG. 17C, such weatherseal is installed in T-slots, as in FIG. 7B, in a frame 134 against which a sash 136, which may contain a casement window moves so as to provide an effective seal. The weatherseal of FIGS. 17A, 17B, and 17C can also be fastened to a frame by adhesive, such as shown in FIG. 7A, rather than using T-slots.

Figure 18A:
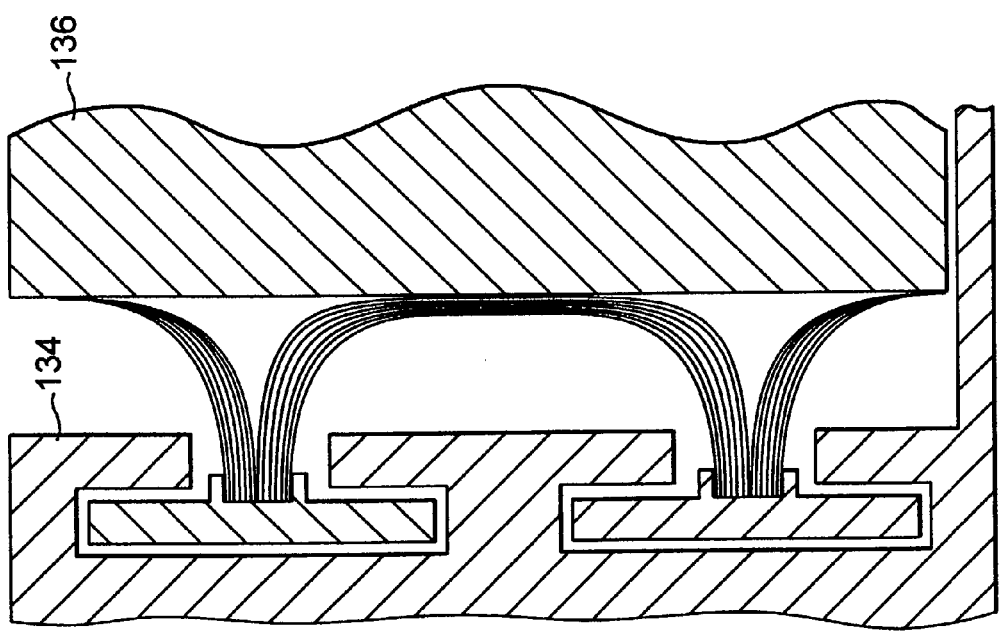
FIGS. 18A, 18B and 18C are sectional views similar to FIGS. 17A, 17B and 17C, respectively.
Figure 18C:
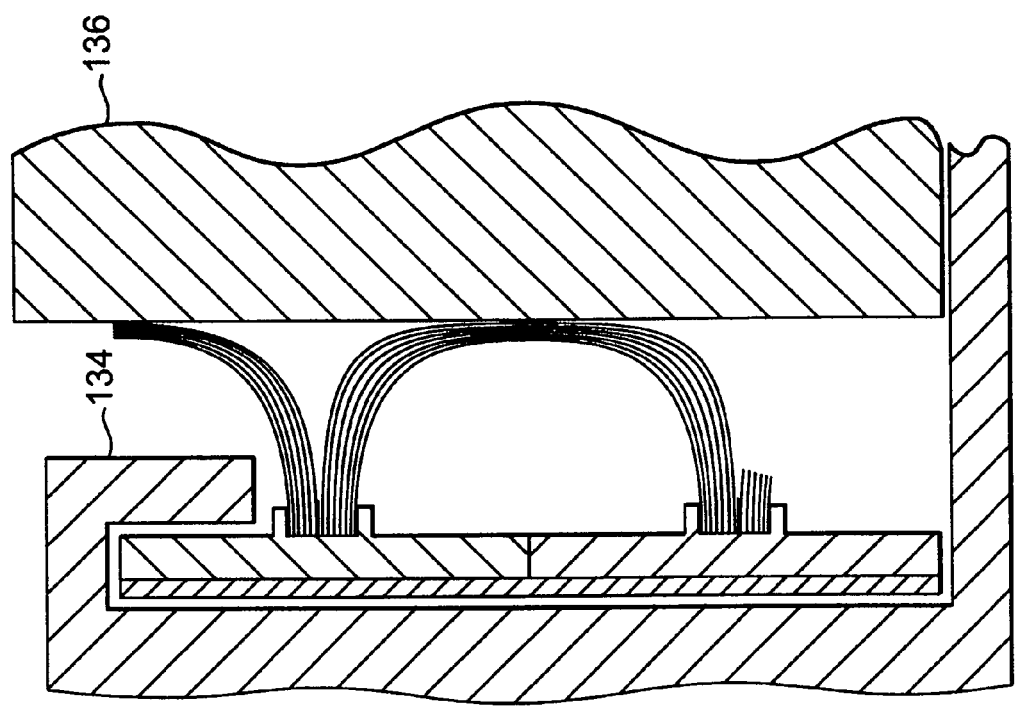
Figure 18B:
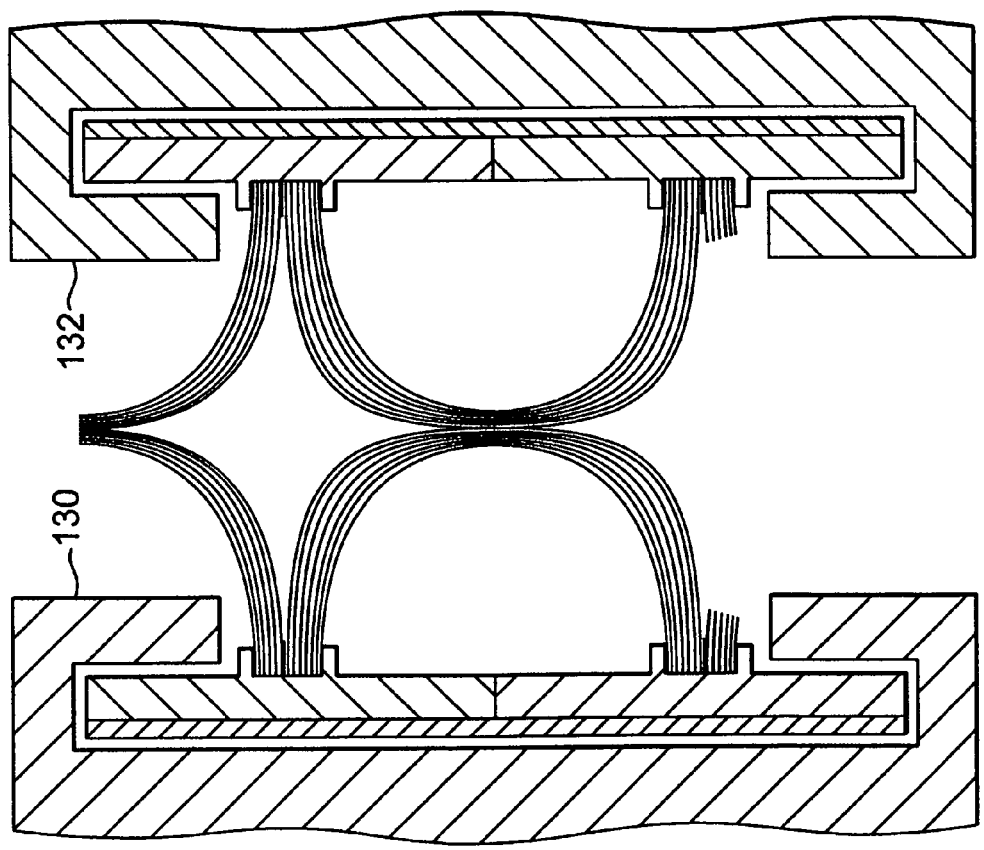

FIGS. 18A, 18B and 18C show swinging door and casement window applications similar to those shown in FIGS. 17A, 17B and 17C but utilizing a weatherseal of FIG. 8 (with or without fin 80 over arch 22e) having one side pile brush sheared off and installed in a T-slot in a frame 130 or 134. This sealing arrangement using the weatherseal may be desirable in case where less closing force on the window or door is desired than is the case with the seal shown in FIGS. 17A, 17B and 17C. The weatherseal of FIGS. 18A, 18B, and 18C can also be fastened to a frame by adhesive, such as shown in FIG. 8A, rather than using a T-slot.

Figure 18D:
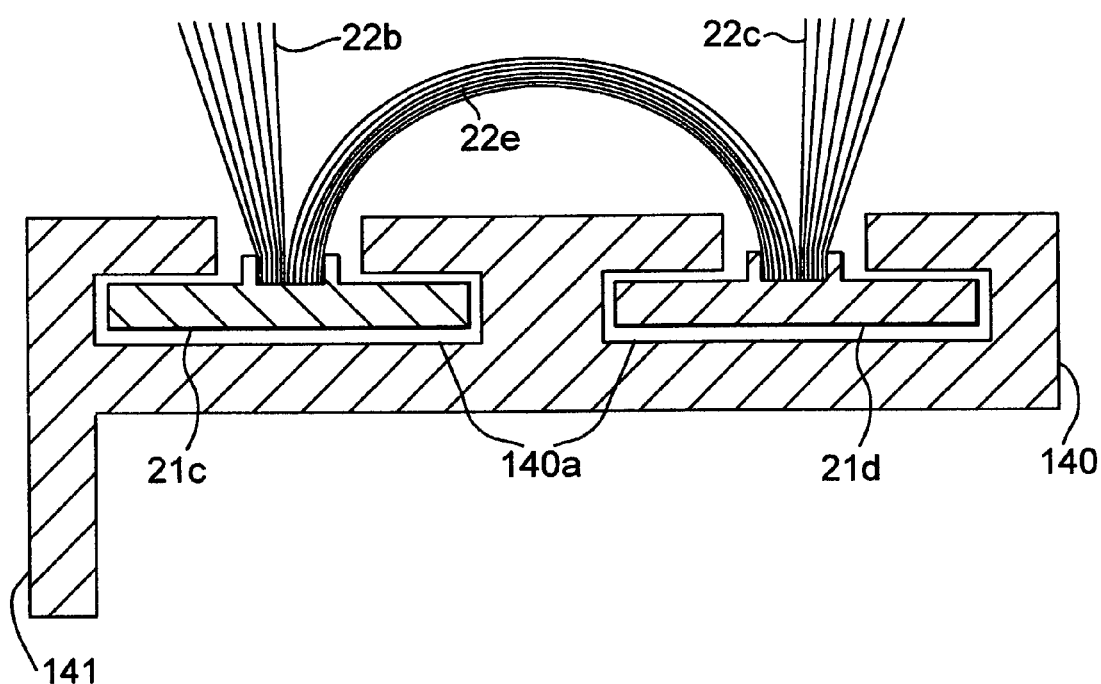
FIG. 18D is a sectional view of a weatherseal of FIG. 7 attached to a frame of a cleaning member which may be used in an electrophotographic apparatus.

Referring to FIGS. 18D and 18E, the weatherseals of FIG. 7 may be used in an electrophotographic apparatus utilizing a photosensitive drum 138 (partially shown) that serves as a movable member which is typically rotatably supported in the electrophotographic apparatus. A charging member, an exposing member, a transferring member (which are not shown) and a cleaning member 139 are arranged in the vicinity of the photosensitive drum 138 so as to surround the photosensitive drum. A frame 140 is provided having two T-slots 140a similar to frame 112a (FIG. 7B). The frame 140 is arranged in a housing 142 that includes the cleaning mechanism so as to face the photosensitive drum 138 as shown in FIG. 18E. A fixing portion 141 is extended from one side surface of frame 140. The fixing portion 141 fixes the frame 140 to the housing 142. The frame 140 is formed of metal, and has conductivity. In the electrophotographic apparatus, the photosensitive drum 138 creates noise and vibrations when rotated. The weatherseal applies an appropriate pressure to the drum 138 to reduce the vibrations and, at the same time, can clean the surface of the photosensitive drum. In this embodiment, the most remarkable effect of the weatherseal is wiping effect of its brush portions 22b and 22c and vibration absorbing effect of its arch portion 22e are both obtained.

If the brush portions are removed and the weatherseal only has the arch portion 22e (see FIG. 9), the weatherseal contacts the drum 138 in a relatively large area, which permits an even charging property compared to a conventional brush. Furthermore, the main objective may be preventing vibration, and a secondary objective may be preventing frictional charging due to contact of the photosensitive drum 138. However, other weatherseals described above (such as of FIGS. 8B and 12) and in different types of frames (such as in FIGS. 8B, 14, 14A) may also be used in the electrophotographic apparatus.

Optionally in an electrophotographic application, a conductive material can be mixed with an included in the synthetic resin that is used for the pile 22 of fibers and the base strips 21c and 21d. Since the conductive material is mixed with the synthetic resin for the pile of fibers and the base strips, conductivity is applied to the pile of fibers and the base strips so that electricity is conducted therein. In this embodiment, polypropylene (PP) including carbon, may be used for the pile of fibers and the base strips.

As shown in FIGS. 19A and 19B, the manufacturing apparatus includes an endless band 51 formed by connecting opposite ends of a band-shaped member. The endless band 51 extends around a plurality of rollers 52. Assuming that a left side end as viewed in the figures is a starting end and a right side end in the same is a terminating end, the endless band 51 is rotated within the apparatus as the rollers 52 at the starting end side are driven by a rotation drive apparatus 53. Between the rollers 52 at the starting end side and rollers 52 at the terminating end side, there are arranged a pile yarn supply section 54, a base member supply section 55, a bonding section 56, a cutting section 57, and a collecting section 58, in the order from the starting end side of the terminating end side.

The pile yarn supply section 54 includes a pair of bobbins 59 opposed to each other with the endless band 51 therebetween. The bobbins 59 are configured such that they rotate about an axis along the extending direction of the endless band 51 while supplying the pile yarns 22 onto the surface of the endless band 51. The base member supply section 55 includes a pair of supply drums 60 opposed to each other, with the endless band 51 therebetween. Each supply drum 60 has the base member 21 received thereon in a state wound therearound, and the base members 21 unwound from the supply drum 60 are supplied to opposite lateral sides of the endless band 51 to hold the endless band 51, such that the supplied base members 21c and 21d are moved in parallel with the endless band 51.

The bonding section 56 includes a pair of horns 61 for transmitting ultrasonic vibrations to the base members 21c and 21d and a pair or urging members 62 for urging the base members 21c and 21d against the endless band 51. Each horn 61 forms a pair with one of the urging members 62. Each pair of one of the horns 61 and the associated urging member 62 sandwiches the endless band 51, and the two pairs are arranged in a staggered configuration with respect to the direction of rotations of the endless band 51. That is, the first horn 61 faces the first urging member 62, and the second horn 61 faces the second urging member 62. The cutting section 57 includes a cutting blade 63 that faces the inner or outer circumference of the endless band 51. In FIGS. 19A and 19B, the cutting blade 63 faces the inner circumference of the endless band 51, and the cutting blade 63 is disposed in the center in the direction of width of the endless band 51. The collecting section 58 has a collecting drum 64 disposed toward one side of the endless band 51, and the manufactured cushioning members 20 are taken up on the collecting drum 64, for being collected.

FIGS. 20A, 20B, and 20C illustrate an apparatus for manufacturing the weatherseal shown in FIG. 4. The manufacturing apparatus shown in FIGS. 20A and 20B is formed by adding a film supply section 65 to the manufacturing apparatus shown in FIGS. 19A and 19B. The film supply section 65 is located upstream of the pile yarn supply section 54. The film supply section 65 has a spool 66 for accommodating the film 80 in a wound state. The film 80 drawn from the spool 66 is supplied to the outer circumferential surface of the endless band 51, and then, together with the endless band 51, supplied to the pile yarn supply section 54.

The weatherseal is made through, after the film supply step, the wrapping step, the base member supply step, the bonding step, the cutting step, and the separating step. The film supply step performed for supplying the film 80 to the outer circumferential surface of the endless band 51, and is executed by the film supply section 65. The film 80 drawn from the spool 66 is supplied to the outer circumferential surface of the endless band 51, and covers the outer surface of the endless band 51 (see FIG. 20C) as noted above, change in location of the blade 63 or the use of additional blade(s) 63a enable the manufacture of the weatherseal embodiments shown in other Figs. of the drawing.

In the next wrapping step, pile yarns 22 supplied by the pair of the bobbins 59 are wrapped around the endless belt 51 covered with the film 80 (see FIG. 20C). Thereafter, in the same manner as the procedure shown in FIGS. 19A and 19B, the base member supply step, the bonding step, the cutting step, and the separating step are performed. Particularly, in the bonding step, the base members 21c and 21d, the pile yarns 22, and the film 80 are joined (or welded) together at contracting areas by vibrations of ultrasonic waves generated by the horns 61.

Figure 21C:
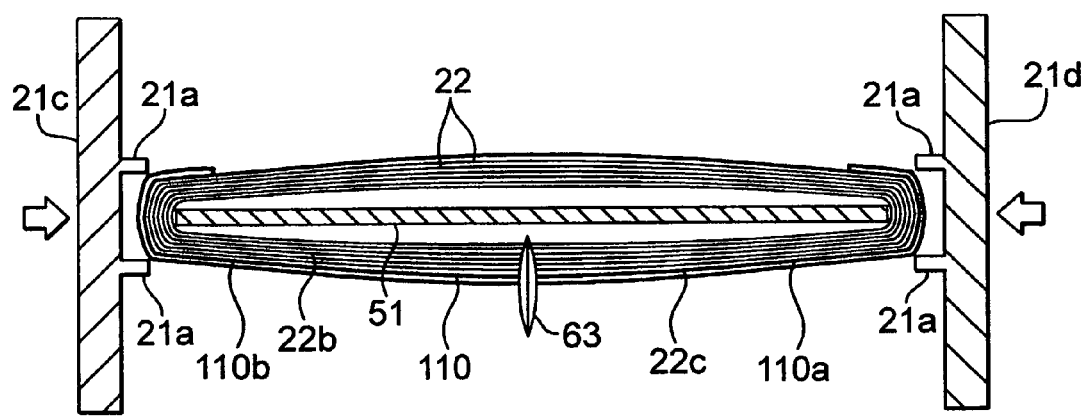
FIG. 21C is a cross-sectional view of the weatherseal at the pile cutting step of FIGS. 21A and 21B.

FIGS. 21A, 21B, and 21C illustrate an apparatus for manufacturing the weatherseal shown in FIG. 5. The manufacturing apparatus of FIGS. 21A and 21B is different from the manufacturing apparatus of FIGS. 20A and 20B in that the film supply section 65 is located between the pile yarn supply section 54 and the base member supply section 55.

The weatherseal is made by performing the film supply step after the wrapping step, and then performing the base member supply step, the bonding step, the cutting step, and the separating step. In the film supply step, the film 110 is supplied to the pile yarns 22, which has been wound around the endless band 51 in the wrapping step, from the outer circumference of the endless band 51. The film 110 drawn from the spool 66 of the film supply section 65 covers the pile yarns 22 on the outer circumferential surface of the endless band 51 (see FIG. 21C).

In the base member supply step, the base members 21c and 21d unwound from the respective supply drums 60 are supplied such that the base members 21c and 21d are positioned at the opposite lateral sides of the endless band 51. At this time, positioning is carried out such that each side section of the endless band 51 is located between the guide linear projections 21a of one of the base members 21, and both ends of the film 110 are folded to encompass the pile yarns 22 on the endless band 51 (see FIG. 21C). Thereafter, in the same manner as the procedure shown in FIGS. 20A and 20B, the bonding step, the cutting step, and the separating step are performed.

There has been described several embodiments of weatherseals provided in accordance with the invention, as well as apparatus for the manufacture thereof. Such weatherseals may be used as seal members, as weatherstripping, or for guiding webs, such as paper, which may be in motion, or for discharging static electricity therefrom. Variations and modifications of the herein described weatherseals and manufacturing apparatus in accordance with the invention will undoubtedly become apparent to those skilled in the art. Accordingly the foregoing description should be taken as illustrative and not in a limiting sense.

The invention claimed is:

1. A weatherseal for presenting a resilient seal against a surface engaging said weatherseal comprising a pair of base strips having a pile of fibers extending lengthwise of said base strips and attached thereto, said base strips being oriented with respect to each other such that said pile forms a resilient arch, bow, or loop between said base strips and has a sealing surface on the exterior of said arch, bow, or loop with the interior surface of said arch, bow or loop facing said pair of base strips.

2. The weatherseal according to claim 1 wherein said arch, bow, or loop is one of a pair of side by side sections of said pile, the other of said pair of sections is cut laterally of said pile base strips such that said one section provides a continuous pile and said other section provides a cut pile.

3. The weatherseal according to claim 2 wherein the cut pile section is disposed inside said arch, bow, or loop.

4. The weatherseal according to claim 2 wherein the cut pile section is disposed outside said arch, bow, or loop.

5. The weatherseal according to claim 3 wherein the cut pile section forms at least one brush.

6. The weatherseal according to claim 3 wherein a pair of brushes formed by said cut pile section each bears against the inside of said arch, bow, or loop and thereby increasing the stiffness presented by said arch, bow, or loop.

7. The weatherseal according to claim 1 further comprising a sheet connected to each of said base strips at opposite ends thereof and extending over the outside surface of said arch, bow, or loop to present said sealing surface.

8. The weatherseal according to claim 2 wherein said cut separates said fibers in said cut pile section into at least one pile brush extending along at least one of said base strips adjacent to said arch, bow, or loop.

9. The weatherseal according to claim 8 wherein said cut is between said base strips.

10. The weatherseal according to claim 9 wherein said cut is between said base strips which divides said cut sections into a pair of side brushes along said arch, bow, or loop.

11. The weatherseal according to claim 9 wherein said cut is a pair of cuts which detaches said cut pile section from said weather seal.

12. The weatherseal according to claim 9 wherein said cut is a pair of cuts laterally through said cut section, one centrally between said base strips and the other defining one of said brushes projecting from one of said base strips.

13. The weatherseal according to claim 9 wherein said cut is a pair of cuts laterally through said cut pile section, said cuts being adjacent to each of said base strips thereby removing brushes provided by said cut pile section from said weather seal.

14. The weatherseal according to claim 1 wherein said base strips present surfaces which are oriented with respect to each at such angle so that the pile therebetween is deflected into said bow, arch, or loop.

15. The weatherseal according to claim 14 wherein said surfaces of said strips from which the ends of said arch, bow, or loop project are generally in the same plane, and said strips have longitudinal edges spaced in the range from touching to a distance which separates said strips from each other.

16. The weatherseal according to claim 14 wherein said surfaces of said base strips from which the bow, arch, or loop project are at an angle to each other so that said weather strip defines a corner seal for a corner of said surface which engages said weatherseal.

17. The weatherseal according to claim 16 wherein said surfaces of said strips from which said bow or arch project are generally perpendicular to each other.

18. The weatherseal according to claim 14 wherein said surfaces from which said bow, arch, or loop project are generally parallel and face in opposite directions so that said pile defines one of said loop of said bow, arch, or loop around an edge of each of said base strips.

19. The weatherseal according to claim 1 further comprising a frame with which said strips and said pile extending therebetween are disposed in assembled relationship.

20. The weatherseal according to claim 19 wherein a backing member extends longitudinally along backsides of said base strips opposite from said bow, arch, or loop, said backing and base strips being attached to each other.

21. The weatherseal according to claim 20 wherein said backing member is a frame having a T-slot in which said base strips are disposed or a pair of T-slots spaced from each other in which said base strips are disposed in spaced relationship.

22. The weatherseal according to claim 20 wherein said fibers are of yarn.

23. The weatherseal according to claim 1 further comprising sheets of material presenting selected air and water permeability and sliding friction being disposed on said bow, arch, or loop over said exterior surface thereof which presents said seal or inside or outside of the brush or brushes provided by said cut pile sections on sides of said bow, arch, or loop.

24. The weatherseal according to claim 4 wherein the cut pile section forms at least one brush.

25. The weatherseal according to claim 14 wherein said surfaces of said base strips from which the bow, arch, or loop project are at an angle to each other so that said weather strip defines a corner seal for a corner of said surface which engages said weatherseal.

26. The weatherseal according to claim 14 wherein said surfaces from which said bow, arch, or loop project are generally parallel and face in opposite directions.

27. The weatherseal according to claim 1 wherein at least said pile of fibers are made of a conductive synthetic resin material.

28. The weatherseal according to claim 27 wherein said pile of fibers and said base strips have conductivity and are made of synthetic resin materials of the same type.

29. A weatherseal assembly including a pile weatherseal, said assembly comprising a frame and a sash or a door frame and a door having separate pile weatherseals comprise a pile which extends between base strips which are oriented with respect to each other to form said pile into bows or arches which oppose each other and move into sealing engagement with each other when said door or sash is closed against said frame and said sealing engagement being provided by exterior surfaces of said bows or arches, with interior surfaces thereof facing said base strips.

30. The invention according to claim 29 wherein said weatherseals each have at least on pile brush extending on one side of said bow or arch which move into engagement with each other when said door or sash is closed.

31. A method for forming a weatherseal comprising the steps of:
providing a pair of base strips having at least one pile of fibers extending lengthwise of said base strips and extending between said base strips; and
orienting said base strips to allow said pile extending between said base strips to form one of an arch, bow, or loop along the length of said base strips to provide a sealing surface on the exterior of said arch, bow, or loop with the interior surface of said arch, bow, or loop facing said pair of base strips.

32. The method according to claim 31 further comprising the step of:
attaching said base strips to a substrate to maintain said orientation of said base strips.

33. The method according to claim 31 further comprising the step of:
installing said base strips in slots along a member to maintain said orientation of said base strips.

34. The method according to claim 31 further comprising the step of:
providing two cut pile sections extending from said base strips each along the outside of said pile forming said arch, bow, or loop.

35. The method according to claim 31 further comprising the step of:
providing two cut pile sections extending from said base strips each along the inside of said pile forming said arch, bow, or loop.

36. The method according to claim 31 further comprising the step of:
providing fin material along the outside of said pile forming said arch bow or loop.

37. The method according to claim 31 wherein at least said pile of fibers are made of a conductive synthetic resin material.

38. The method according to claim 37 wherein said pile of fibers and said base strips have conductivity and are made of synthetic resin materials of the same type.

39. A weatherseal comprising a pair of base strips having at least one pile of fibers extending lengthwise of said base strips and extending between said base strips in which said base strips are oriented with respect to each other to form said pile extending between said base strips into one of an arch, bow, or loop having an exterior sealing surface and having an interior surface facing said base strips.

40. The weatherseal according to claim 39 wherein at least said pile of fibers are made of a conductive synthetic resin material.

41. The weatherseal according to claim 40 wherein said pile of fibers and said base strips have conductivity and are made of synthetic resin materials of the same type.

42. A pile article for an electrophotographic apparatus comprising a pair of base strips having at least one pile of fibers extending lengthwise of said base strips and extending between said base strips in which said base strips are oriented with respect to each other such that said pile extending between said base strips forms one of an arch, bow, or loop, having an exterior surface located adjacent to a movable surface in the electrophotographic apparatus on the exterior of said arch, bow, or loop with the interior of said arch, bow or loop facing said base strips.

43. The pile article according to claim 42 wherein said pile article cleans said movable surface.

44. The pile article according to claim 42 wherein at least said pile of fibers are conductive.

45. The pile article according to claim 42 wherein said pile article reduces vibration of said movable surface.

46. Weatherseal comprising base members each having a pair of edges and oriented so that one of said pair of edges of each of said members is closer to each other than is the other of said pair of edges thereof, and an arch or bow of a pile of fibers extending between said members and attached separately thereto, said arch, bow, or loop having convex and concave sides on the exterior and interior thereof, said interior concave side facing said base members and said exterior convex side facing outwardly and providing a sealing surface of said weather seal.

47. A weatherseal for presenting a resilient seal against a surface engaging said weatherseal comprising a pair of base strips having a pile of fibers extending lengthwise of said base strips and attached thereto, said pile extending between said base strips, said pile defining a resilient arch, bow, or loop arc between said base strips exceeding at least about 180° circumferentially completely along said arch, bow, or loop, in which said arch, bow or loop has an exterior surface which provides said resilient seal, and said arch, bow or loop faces said base strips on the inside thereof.

* * * * *